(12) United States Patent
Bendimerad et al.

(10) Patent No.: US 11,496,221 B2
(45) Date of Patent: Nov. 8, 2022

(54) OPTICAL TRANSMITTER AND TRANSMISSION METHOD

(71) Applicant: Huawei Technologies Co., Ltd., Shenzhen (CN)

(72) Inventors: Djalal Falih Bendimerad, Boulogne Billancourt (FR); Hartmut Hafermann, Boulogne Billancourt (FR); Huijian Zhang, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/402,268

(22) Filed: Aug. 13, 2021

(65) Prior Publication Data

US 2021/0384984 A1 Dec. 9, 2021

Related U.S. Application Data

(63) Continuation of application No. 16/810,620, filed on Mar. 5, 2020, now Pat. No. 11,095,371, which is a
(Continued)

(30) Foreign Application Priority Data

Sep. 5, 2017 (WO) .................. PCT/EP2017/072258

(51) Int. Cl.
*H04B 10/532* (2013.01)
*H04B 10/516* (2013.01)
(Continued)

(52) U.S. Cl.
CPC ....... *H04B 10/532* (2013.01); *H04B 10/2557* (2013.01); *H04B 10/5161* (2013.01);
(Continued)

(58) Field of Classification Search
CPC .............. H04B 10/532; H04B 10/2557; H04B 10/5161; H04B 10/5561; H04B 10/564; H04L 1/0042
(Continued)

(56) References Cited

U.S. PATENT DOCUMENTS 8,073,338 B2 * 12/2011 Buelow ................ H04B 10/548
398/184
8,611,751 B2 12/2013 Liu et al.
(Continued)

FOREIGN PATENT DOCUMENTS

CN 101557260 A 10/2009
CN 102209055 A 10/2011
(Continued)

OTHER PUBLICATIONS

Shiner et al., "Demonstration of an 8-dimensional modulation format with reduced inter-channel nonlinearities in a polarization multiplexed coherent system," vol. 22, No. 17, XP055314567, pp. 20366-20374, Optics Express, OSA (Aug. 2014).
(Continued)

*Primary Examiner* — Abbas H Alagheband
(74) *Attorney, Agent, or Firm* — Leydig, Voit & Mayer, Ltd.

(57) ABSTRACT

An optical transmitter, having an encoder and modulator, transmits a data signal. The encoder maps information bits of the data signal to a symbol in eight-dimensional (8D) constellation space spanned by vectors IXT1, QXT1, IYT1, QYT1, IXT2, QXT2, IYT2, QYT2, wherein I and Q are in-phase and quadrature components of an optical carrier, X and Y are orthogonal polarizations of the optical carrier, and T1 and T2 are two consecutive transmission time slots, by selecting the symbol from a set of constellation points in the 8D space. The modulator uses the symbol in the two
(Continued)

consecutive transmission time slots to modulate two carrier waves, and to transmit the two carrier waves over the orthogonal polarizations of the optical carrier. The set of constellation points do not include any constellation point with parallel Stokes vectors in the two consecutive transmission time slots but comprise constellation points with orthogonal Stokes vectors.

25 Claims, 5 Drawing Sheets

Related U.S. Application Data continuation of application No. PCT/EP2018/073635, filed on Sep. 3, 2018.

(51) Int. Cl.
*H04B 10/556* (2013.01)
*H04L 1/00* (2006.01)
*H04B 10/2557* (2013.01)
*H04B 10/564* (2013.01)

(52) U.S. Cl.
CPC ....... *H04B 10/5561* (2013.01); *H04L 1/0042* (2013.01); *H04B 10/564* (2013.01)

(58) Field of Classification Search
USPC ........................................................ 398/184
See application file for complete search history.

(56) References Cited

U.S. PATENT DOCUMENTS

| | | | |
|---|---|---|---|
| 8,824,501 | B2 | 9/2014 | Liu et al. |
| 9,143,238 | B2 * | 9/2015 | Roberts ................ H04B 10/532 |
| 9,621,275 | B2 | 4/2017 | Kojima et al. |
| 9,749,058 | B2 | 8/2017 | Reimer et al. |
| 9,768,875 | B2 * | 9/2017 | Zhuge ................ H04B 10/5055 |
| 9,806,739 | B1 * | 10/2017 | Kojima .............. H04B 10/5561 |
| 10,122,489 | B2 | 11/2018 | Nakashima |
| 10,211,928 | B2 | 2/2019 | Karar et al. |
| 10,587,358 | B1 * | 3/2020 | Ebrahimzad ......... H04B 10/516 |
| 2003/0172336 | A1 | 9/2003 | Sweeney |
| 2012/0148255 | A1 | 6/2012 | Liu et al. |
| 2012/0224862 | A1 | 9/2012 | Liu et al. |
| 2014/0133865 | A1 * | 5/2014 | Reimer ................ H04B 10/532 398/152 |
| 2015/0195045 | A1 * | 7/2015 | Zhuge ................ H04B 10/2557 398/184 |
| 2016/0204894 | A1 * | 7/2016 | Dong ................ H04B 10/5053 398/65 |
| 2016/0261347 | A1 | 9/2016 | Karar et al. |
| 2016/0352419 | A1 | 12/2016 | Fonseka et al. |
| 2017/0294448 | A1 | 10/2017 | Debacker et al. |
| 2017/0373916 | A1 | 12/2017 | Oh et al. |
| 2018/0076930 | A1 * | 3/2018 | Buchali .............. H04B 10/5161 |
| 2018/0269983 | A1 | 9/2018 | Karar et al. |

FOREIGN PATENT DOCUMENTS

| | | | |
|---|---|---|---|
| CN | 103916216 A | | 7/2014 |
| CN | 105359445 A | | 2/2016 |
| CN | 107147606 A | * | 9/2017 ........... H04B 7/0854 |

OTHER PUBLICATIONS

Karlsson, et al., "Which is the most power-efficient modulation format in optical links?," vol. 17, No. 13, pp. 10814-10819, Optics Express, OSA (Jun. 2009).

Reimer et al., "Optimized 4 and 8 Dimensional Modulation Formats for Variable Capacity in Optical Networks," OFC 2016, 3 pages, OSA (2016).

Reimer et al., "Performance Optimized Modulation Formats in 4 and 8 Dimensions," Advanced Photonics, 3 pages, OSA (2015).

Lun et al., "An Improved Two-Stage Carrier Phase Estimation Algorithm in Coherent Optical Communication," Study on Optical Communications, (Jun. 2016) with English abstract.

Kang et al., "Improved Speed Near Field Communication with Rotated QPSK Constellation and Hidden Data Transmission," IEEE International Symposium on Broadband Multimedia Systems and Broadcasting, pp. 1-2, Institute of Electrical and Electronics Engineers, New York, New York (2012).

Erik Agrell et al, "Power-efficient modulation formats in coherent transmission systems", Journal of Lightwave Tech vol. 27, Nov. 22, 2009 (Year: 2009).

U.S. Appl. No. 16/810,620, filed Mar. 5, 2020.

* cited by examiner

OPTICAL TRANSMITTER AND TRANSMISSION METHOD

CROSS-REFERENCE TO RELATED APPLICATIONS

This application is a continuation of U.S. patent application Ser. No. 16/810,620, filed on Mar. 5, 2020, now U.S. Pat. No. 11,095,371, which is a continuation of International Application No. PCT/EP2018/073635, filed on Sep. 3, 2018, which claims priority to International Patent Application No. PCT/EP2017/072258, filed on Sep. 5, 2017. All of the afore-mentioned patent applications are hereby incorporated by reference in their entireties.

FIELD

The disclosure relates to an optical transmitter and to a method for optically transmitting a data signal. The disclosure relates to the encoding and modulating of the data signal to be transmitted, and thereby especially to the use of high dimensional modulation formats.

BACKGROUND

In modern optical coherent transmission, information (a data signal) is encoded in the amplitude and phase of a carrier wave emitted by a laser. To this end, information bits of the data signal are mapped to symbols, which can be represented by complex numbers. A given complex symbol is then used in turn to modulate the in-phase (I) and quadrature (Q) components of an optical carrier during a fixed time duration (referred to as 'symbol time', 'interval' or transmission 'time slot'). In conventional polarization-multiplexed transmission, two carrier waves are modulated and transmitted over two orthogonal polarizations (referred to as X and Y) of the optical carrier. The optical carrier is, for instance, an optical fiber.

It has been realized that performance gains and intermediate spectral efficiencies can be achieved by designing so-called high-dimensional modulation formats. In particular, one can imagine each combination of the above-mentioned degrees of freedom as one dimension of a high-dimensional space. For example, the I-component of the X polarization may correspond to one dimension, which can be labelled IX. Then, a four-dimensional space spanned by vectors (IX, QX, IY, QY) can be obtained. The dimension of this space can be increased e.g. to eight by grouping pairs of time slots and adding the time slot (indexed 1 or 2 for two consecutive time slots) as an additional degree of freedom. This scheme can be generalized to even higher dimensions by increasing further the number of time slots to more than 2.

Selecting constellation points (so-called set partitioning) in the high-dimensional space corresponds to introducing constraints between the different degrees of freedom. Such constraints can be used to optimize linear performance of an optical transmitter using the modulation format. For example, linear performance can be improved by choosing points from a lattice that corresponds to a dense packing in high dimensions. Nonlinear performance can, for example, be optimized by choosing constellation points with pre-defined values of the polarization state.

However, the design of (high-dimensional) modulation formats for optical coherent transmission is a great technical challenge. This is due to the many boundary conditions the modulation formats have to comply with. That is, for instance, the modulation formats should meet the requirement of a maximum Required Optical Signal to Noise Ratio (ROSNR). Therefore, good performance in the linear and nonlinear channel is required. The ROSNR value is fixed by the type of coherent optical transmission system. For long haul and ultra-long haul transmission systems, the major limitation is the fiber Kerr effect, which impairs a wavelength and polarization multiplexed optical signal by introducing Self Phase Modulation (SPM), Cross Phase Modulation (XPM) and Cross Polarization Modulation (XPolM). Accordingly, one technical challenge here is reducing (mitigating) these effects on the optical signal.

Furthermore, in the context of the present disclosure, the modulation formats should be able to operate at intermediate spectral efficiencies between 2 and 4 bits/interval, wherein the projection onto an interval comprises the four dimensions: in-phase (I) and quadrature (Q) each in two orthogonal polarizations (X, Y). The modulation formats should also be constructed with a simple mapping, so that they can be implemented with low complexity in an optical transmitter or transmission system. Finally, the modulation formats should have optimal labeling of the constellation points to result in a good linear performance of the optical transmission system.

The first two modulation formats that were used in this context are Polarization Division Multiplexed Binary Phase Shift Keying and Quadrature Phase Shift Keying (PDM-BPSK and PDM-QPSK), which operate at spectral efficiencies of 2 and 4 bits/interval, respectively. These modulation formats are designed in four dimensions: I and Q in each of two orthogonal polarizations. These symbols have constant modulus. This means that the power of a symbol (the signal that is used to drive the modulator) including both polarizations does not vary in time. This property contributes to mitigating fiber nonlinear impairments compared to legacy systems using the On-Off Keying (OOK) modulation format with a time-varying power envelope.

Later the Polarization Switched (PS) Quadrature Phase Shift Keying (PS-QPSK) modulation format was proposed, which reaches an intermediate spectral efficiency of 3 bits/interval, and exhibits good linear and nonlinear performances. The idea underlying PS-QPSK for enhancing the nonlinear performance is that of polarization switching. The polarization state can only take two values for any four-dimensional symbol. As a result the averaged polarization-rotation and therefore XPolM caused by one signal on another are reduced. These modulation formats also have a very simple mapping. The linear performance (performance of the modulation format used in an optical transmitter under linear transmission conditions) depends on the labeling, that is, the assignment of bit sequences to constellation points. For the mentioned modulation formats optimal performance is achieved by using standard Gray-labeling.

However, with technology advancing further, the PDM-BPSK, PS-QPSK and PDM-QPSK nonlinear performances are not acceptable anymore, and need to be enhanced. The following describes how this problem was addressed in the state of the art, and what the disadvantages of the proposed conventional solutions are.

In the conventional solutions, 8-dimensional modulation formats at 2.5, 3 and 3.5 bits/interval were proposed. The conventional solutions used the known fact that high nonlinear tolerance is achieved by designing modulation formats with a constant modulus. That is, the power of the symbols in all time slots is the same. In addition to this constraint, the conventional solutions proposed using the condition of polarization balancing (PB) in consecutive time slots, i.e. the sum of Stokes-vectors over all symbols in time vanishes. Such a property reduces the XPolM effects.

The modulation formats of the conventional solutions are constructed ad hoc, for example, by choosing a 4 dimensional (4D) base format with constant modulus, replicating it in subsequent time slots, and applying the polarization balance criterion. This can be exemplified by the construction of the following three modulation formats.

In order to obtain PB-PS-QPSK symbols in a first conventional solution, a set partitioning method was used based on a set of symbols offered by PS-QPSK. In 8 dimensions (8D), the latter offers 64 symbols, which corresponds to a spectral efficiency of 3 bits/interval. Using a polarization balance criterion, the conventional solution set partitions PS-QPSK to obtain 32 symbols in 8 dimensions, hence a spectral efficiency of 2.5 bits/interval.

For the PB-PM-QPSK modulation format, a second conventional solution uses QPSK symbols for each of the two polarizations on the first time slot, and one of the polarizations on the second time slot. Then, it uses a formula to obtain the symbol of the remaining polarization on the second time slot. The formula fixes the constraint of the degree of polarization of a symbol, which is equal to zero in two consecutive time slots. Therefore, the obtained symbols are polarization balanced in two consecutive time slots. With this constraint, the maximum number of symbols is 64 in 8D, which represents a spectral efficiency of 3 bits/interval.

Using QPSK symbols with the polarization balance property reaches at most 3 bits/interval. In order to reach a spectral efficiency of 3.5 bits/interval, a third conventional solution proposed using a combination of QPSK and 8PSK symbols, increasing the number of symbols that are used to obtain the modulation format. The same approach that was used to obtain PB-PM-QPSK was followed for this modulation format: Symbols for the two polarizations on the first time slot and one polarization of the second time slot are chosen from QPSK and 8PSK symbols, then the same formula as before is used to obtain the symbol of the remaining polarization on the second time slot. The polarization balance criterion is consequently satisfied and a spectral efficiency of 3.5 bits/interval is reached.

The disadvantage of the above-mentioned conventional solutions is that the modulation format construction does not necessarily yield optimal linear or nonlinear performance, mainly because the polarization balance criterion is too restrictive. This has two main drawbacks: Firstly, at higher spectral efficiencies, one has to use base constellations with reduced Euclidean distance to satisfy the constraint. This negatively impacts the linear performance of an optical transmitter when using the conventional solution. Secondly, when applying set-partitioning to a specialized format such as PS-QPSK does not necessarily yield the optimal nonlinear performance when used by an optical transmitter. Furthermore, simple mapping rules from bits of a data signal to symbols have not been given.

SUMMARY

In view of the above-mentioned challenges and disadvantages, the present disclosure improves the conventional solutions for modulation formats to be used in optical transmission systems. The present disclosure provides an optical transmitter and a transmitting method, which operate with better performance compared to the corresponding solutions known in the art. Thereby, high-dimensional modulation formats with a spectral efficiency ranging from 2 to 4 bits/interval, and better linear and nonlinear performances, are desired. Further, simple mapping rules from data signal bits to symbols should be given.

A first aspect of the disclosure provides an optical transmitter for transmitting a data signal, comprising an encoder configured to encode the data signal by selecting based on a bit sequence a first symbol and a second symbol from a set of four symbols for each one of at least two transmission time slots, and a modulator configured to use in each transmission time slot the first symbol to modulate a first carrier wave and the second symbol to modulate a second carrier wave, and to transmit the two carrier waves over orthogonal polarizations of an optical carrier, wherein symbols in consecutive transmission time slots have non-identical polarization states.

The optical transmitter of the first aspect achieves a better performance than an optical transmitter according to the conventional solutions. While symbols ideally have opposite polarization in consecutive time slots (referred to as 'polarization balancing', which is strictly applied in the conventional solutions), the inventors of the present disclosure have found that it is most important to avoid symbols having identical states of polarization in consecutive time slots (referred to as 'polarization identical'). Symbols which have different polarization states in subsequent time slots (referred to as 'polarization alternating', PA) may potentially degrade the nonlinear performance, when they are used in place of polarization balanced (PB) symbols. However using such symbols relaxes the PB constraint and thereby allows one to significantly improve the linear performance as detailed below.

It is noted that in the present disclosure 'polarization states' are as described by their corresponding Stokes vectors. That means, designations like 'antiparallel' 'opposite', 'different' or 'orthogonal' polarization states refer to the relative orientation of the Stokes vectors of symbols in subsequent time slots. As known in the art, the Stokes vector can be calculated given two symbols corresponding to the two polarizations. The result of the calculation depends on the definition of the Stokes vector (or the used basis). However, in the present disclosure the important point is that the Stokes vectors in consecutive time slots are not identical, and in particular may be 'antiparallel' or 'orthogonal'. These properties do not depend on the definition of the Stokes vector.

The optical transmitter of the first aspect uses a set of four symbols, i.e. a common base constellation, which leads to an improved linear performance compared to the conventional solutions known in the art. This is because the base constellation has a higher Euclidian distance than other constellations, for instance, when compared to constellations used in the conventional solutions. The use of the QPSK base constellation here is possible only because the polarization-balance criterion is relaxed in comparison with its strict use in the conventional solutions.

By using a set of only four symbols, and not strictly using the 'polarization balancing' but the 'polarization alternating' concept, the optical transmitter of the first aspect can be used with different modulation formats, which all result in better linear and non-linear channel performance at the same spectral efficiency. In particular, two exemplary modulation formats are presented later, both having eight-dimensional (8D) modulation formats at spectral efficiencies of 2.5 and 3.5 bits/transmission time slot (bits/interval), respectively.

In an implementation form of the first aspect, the encoder is configured to select the symbols from a QPSK base constellation.

Only the relaxing of the polarization-balance criterion allows using, for instance, the PDM-QPSK as the base constellation. In contrast thereto, it is not possible in general to use a QPSK base constellation with the strict polarization balancing applied in the conventional solutions.

In a further implementation form of the first aspect, the modulator is configured to modulate an In-Phase and a Quadrature component of each carrier wave.

In a further implementation form of the first aspect, symbols in at least a subset of consecutive transmission time slots have anti-parallel polarization states.

The use of anti-parallel Stokes vectors in subsequent time slots, where possible, improves the performance of the optical transmitter.

In a further implementation form of the first aspect, the encoder is configured to generate the bit sequence based on the data signal, and the data signal comprises less bits than the encoded bit sequence.

In a further implementation form of the first aspect, the encoder is configured to perform at least one arithmetic operation based on at least two bits of the data signal to obtain at least one overhead bit, and to generate the bit sequence based on the bits of the data signal and at least one overhead bit.

According to the above implementation forms, overhead bits are generated. The use of overhead bits results implicitly in constraints for selecting the symbols, which leads to a better nonlinear performance.

In a further implementation form of the first aspect, the optical transmitter is configured to transmit the data signal with a spectral efficiency of 2.5 bits per transmission time slot.

In a further implementation form of the first aspect, the symbol polarization states in each transmission time slot take one of at least four distinct polarizations states.

This distinguishes from the conventional solutions and leads to better overall performance.

In a further implementation form of the first aspect, the data signal has five bits $b1 \ldots b5$, and the encoder is configured to generate the bit sequence having eight bits $b1 \ldots b5, b1', b2', b3'$, wherein three overhead bits $b1', b2', b3'$ are generated according to $$b1' = b3 \text{ XOR } b4 \text{ XOR } b5$$

$$b2' = \overline{b2} \text{ XOR } b4 \text{ XOR } b5$$

$$b3' = \overline{b1} \text{ XOR } b4 \text{ XOR } b5$$

In a further implementation form of the first aspect, for two consecutive transmission time slots T1 and T2, for two orthogonal polarizations X and Y of the optical carrier, and for a set of four QPSK symbols denoted $-1-1i, -1+1i, 1-1i$ and $1+1i$, the encoder is configured to select the symbols based on the data signal according to the following labelling

| Labelling (from left to right) 5 bits b1 ... b5, and 3 overhead bits b1', b2', b3' | Time slot $T_1$ | | Time slot $T_2$ | |
|---|---|---|---|---|
| | X polarization | Y polarization | X polarization | Y polarization |
| 0 0 0 0 0 0 1 1 | −1−li | −1−li | −1−li | 1+li |
| 0 0 0 0 1 1 0 0 | −1−li | −1−li | 1+li | −1−li |
| 0 0 0 1 0 1 0 0 | −1−li | −1+li | −1−li | −1−li |
| 0 0 0 1 1 0 1 1 | −1−li | −1+li | 1−li | 1+li |
| 0 0 1 0 0 1 1 1 | −1−li | 1−li | −1+li | 1+li |
| 0 0 1 0 1 0 0 0 | −1−li | 1−li | 1−li | −1−li |
| 0 0 1 1 0 0 0 0 | −1−li | 1+li | −1−li | −1−li |
| 0 0 1 1 1 1 1 1 | −1−li | 1+li | 1+li | 1+li |
| 0 1 0 0 0 0 0 1 | −1−li | −1−li | −1−li | −1+li |
| 0 1 0 0 1 1 1 0 | −1−li | −1−li | 1+li | 1−li |
| 0 1 0 1 0 1 1 0 | −1−li | −1+li | −1−li | 1−li |
| 0 1 0 1 1 0 0 1 | −1−li | −1+li | 1−li | −1+li |
| 0 1 1 0 0 1 0 1 | −1−li | 1−li | −1+li | −1+li |
| 0 1 1 0 1 0 1 0 | −1−li | 1−li | 1−li | 1−li |
| 0 1 1 1 0 0 1 0 | −1−li | 1+li | −1−li | 1−li |
| 0 1 1 1 1 1 0 1 | −1−li | 1+li | 1+li | −1+li |
| 1 0 0 0 0 0 1 0 | 1−li | −1−li | −1−li | 1−li |
| 1 0 0 0 1 1 0 1 | 1−li | −1−li | 1+li | −1+li |
| 1 0 0 1 0 1 0 1 | 1−li | −1+li | −1−li | −1+li |
| 1 0 0 1 1 0 1 0 | 1−li | −1+li | 1−li | 1−li |
| 1 0 1 0 0 1 1 0 | 1−li | 1−li | −1+li | 1−li |
| 1 0 1 0 1 0 0 1 | 1−li | 1−li | 1−li | −1+li |
| 1 0 1 1 0 0 0 1 | 1−li | 1+li | −1−li | −1+li |
| 1 0 1 1 1 1 1 0 | 1−li | 1+li | 1+li | 1−li |
| 1 1 0 0 0 0 0 0 | 1+li | −1−li | −1−li | −1−li |
| 1 1 0 0 1 1 1 1 | 1+li | −1−li | 1+li | 1+li |
| 1 1 0 1 0 1 1 1 | 1+li | −1+li | −1+li | 1+li |
| 1 1 0 1 1 0 0 0 | 1+li | −1+li | 1−li | −1−li |
| 1 1 1 0 0 1 0 0 | 1+li | 1−li | −1+li | −1−li |
| 1 1 1 0 1 0 1 1 | 1+li | 1−li | 1−li | 1+li |
| 1 1 1 1 0 0 1 1 | 1+li | 1+li | −1+li | 1+li |
| 1 1 1 1 1 1 0 0 | 1+li | 1+li | 1+li | −1−li |

The above-given tables and formulas define the 2.5 bits/transmission time slot modulation format according to the previous implementation defines the modulation format up to symmetries and change of labels, which change the formulas to generate the overhead bits and lead to equivalent modulation formats with the same performance.

According to the above implementation forms, the modulation format at the spectral efficiency of 2.5 bits/interval in 8D is realized. The modulation format has a better nonlinear performance than the conventional solution with the same spectral efficiency. In particular, the modulation format has a better nonlinear performance (found to be 0.35 dB higher in $Q^2$ factor), even though the linear performance is the same. It is noted that the conventional solution for spectral efficiency of 2.5 bit/interval has only two different polarization states, while the one of the above implementation forms of the first aspect has four.

In a further implementation form of the first aspect, the optical transmitter is configured to transmit the data signal with a spectral efficiency of 3.5 bits per transmission time slot.

In a further implementation form of the first aspect, symbols in at least a subset of consecutive transmission time slots have orthogonal polarization states.

The use of orthogonal Stokes vectors in subsequent time slots, where possible, improves the performance of the optical transmitter.

In a further implementation form of the first aspect, a portion of the data signal has seven bits b1 . . . b7, and the encoder is configured to generate the bit sequence having eight bits b1 . . . b7, b', wherein the overhead bit b' is generated according to:

$b'$=$b1$ XOR $b4$ XOR $b6$ XOR($b1$AND$b3$)XOR
($b1$AND$b4$)XOR($b1$AND$b5$)XOR($b1$AND$b6$)
XOR($b2$AND$b3$)XOR($b2$AND$b4$)XOR
($b2$AND$b5$)XOR($b2$AND$b6$)XOR($b3$AND$b5$)
XOR($b3$AND$b6$)XOR($b4$AND$b5$)XOR
($b4$AND$b6$)

In a further implementation form of the first aspect, for two consecutive transmission time slots T1 and T2, for two orthogonal polarizations X and Y of the optical carrier, and for a set of four QPSK symbols denoted −1−1i, −1+1i, 1−1i and 1+1i, the encoder is configured to select the symbols based on the data signal according to the following labelling

| Labelling (from left to right) 7 bits b1 . . . b7, and 1 overhead bit b' | Time slot $T_1$ | | Time slot $T_2$ | |
|---|---|---|---|---|
| | X polarization | Y polarization | X polarization | Y polarization |
| 0 0 0 0 0 0 0 1 | −1−1i | −1−1i | −1−1i | −1+1i |
| 0 0 0 0 0 0 1 1 | −1−1i | −1−1i | −1−1i | 1+1i |
| 0 0 0 0 0 1 0 0 | −1−1i | −1−1i | −1+1i | −1−1i |
| 0 0 0 0 0 1 1 0 | −1−1i | −1−1i | −1+1i | 1−1i |
| 0 0 0 0 1 0 0 1 | −1−1i | −1−1i | 1−1i | −1+1i |
| 0 0 0 0 1 0 1 1 | −1−1i | −1−1i | 1−1i | 1+1i |
| 0 0 0 0 1 1 0 0 | −1−1i | −1−1i | 1+1i | −1−1i |
| 0 0 0 0 1 1 1 0 | −1−1i | −1−1i | 1+1i | 1−1i |
| 0 0 0 1 0 0 0 0 | −1−1i | −1+1i | −1−1i | −1−1i |
| 0 0 0 1 0 0 1 0 | −1−1i | −1+1i | −1−1i | 1−1i |
| 0 0 0 1 0 1 0 0 | −1−1i | −1+1i | −1+1i | −1−1i |
| 0 0 0 1 0 1 1 0 | −1−1i | −1+1i | −1+1i | 1−1i |
| 0 0 0 1 1 0 0 1 | −1−1i | −1+1i | 1−1i | −1+1i |
| 0 0 0 1 1 0 1 1 | −1−1i | −1+1i | 1−1i | 1+1i |
| 0 0 0 1 1 1 0 1 | −1−1i | −1+1i | 1+1i | −1+1i |
| 0 0 0 1 1 1 1 1 | −1−1i | −1+1i | 1+1i | 1+1i |
| 0 0 1 0 0 0 0 1 | −1−1i | 1−1i | −1−1i | −1+1i |
| 0 0 1 0 0 0 1 1 | −1−1i | 1−1i | −1−1i | 1+1i |
| 0 0 1 0 0 1 0 1 | −1−1i | 1−1i | −1+1i | −1+1i |
| 0 0 1 0 0 1 1 1 | −1−1i | 1−1i | −1+1i | 1+1i |
| 0 0 1 0 1 0 0 0 | −1−1i | 1−1i | 1−1i | −1−1i |
| 0 0 1 0 1 0 1 0 | −1−1i | 1−1i | 1−1i | 1−1i |
| 0 0 1 0 1 1 0 0 | −1−1i | 1−1i | 1+1i | −1−1i |
| 0 0 1 0 1 1 1 0 | −1−1i | 1−1i | 1+1i | 1−1i |
| 0 0 1 1 0 0 0 0 | −1−1i | 1+1i | −1−1i | −1−1i |
| 0 0 1 1 0 0 1 0 | −1−1i | 1+1i | −1−1i | 1−1i |
| 0 0 1 1 0 1 0 1 | −1−1i | 1+1i | −1+1i | −1+1i |
| 0 0 1 1 0 1 1 1 | −1−1i | 1+1i | −1+1i | 1+1i |
| 0 0 1 1 1 0 0 0 | −1−1i | 1+1i | 1−1i | −1−1i |
| 0 0 1 1 1 0 1 0 | −1−1i | 1+1i | 1−1i | 1−1i |
| 0 0 1 1 1 1 0 1 | −1−1i | 1+1i | 1+1i | −1+1i |
| 0 0 1 1 1 1 1 1 | −1−1i | 1+1i | 1+1i | 1+1i |
| 0 1 0 0 0 0 0 1 | −1+1i | −1−1i | −1−1i | −1+1i |
| 0 1 0 0 0 0 1 1 | −1+1i | −1−1i | −1−1i | 1+1i |
| 0 1 0 0 0 1 0 1 | −1+1i | −1−1i | −1+1i | −1+1i |
| 0 1 0 0 0 1 1 1 | −1+1i | −1−1i | −1+1i | 1+1i |
| 0 1 0 0 1 0 0 0 | −1+1i | −1−1i | 1−1i | −1−1i |
| 0 1 0 0 1 0 1 0 | −1+1i | −1−1i | 1−1i | 1−1i |
| 0 1 0 0 1 1 0 0 | −1+1i | −1−1i | 1+1i | −1−1i |
| 0 1 0 0 1 1 1 0 | −1+1i | −1−1i | 1+1i | 1−1i |
| 0 1 0 1 0 0 0 1 | −1+1i | −1+1i | −1−1i | −1+1i |
| 0 1 0 1 0 0 1 1 | −1+1i | −1+1i | −1−1i | 1+1i |
| 0 1 0 1 0 1 0 0 | −1+1i | −1+1i | −1+1i | −1−1i |
| 0 1 0 1 0 1 1 0 | −1+1i | −1+1i | −1+1i | 1−1i |
| 0 1 0 1 1 0 0 1 | −1+1i | −1+1i | 1−1i | −1+1i |
| 0 1 0 1 1 0 1 1 | −1+1i | −1+1i | 1−1i | 1+1i |
| 0 1 0 1 1 1 0 0 | −1+1i | −1+1i | 1+1i | −1−1i |
| 0 1 0 1 1 1 1 0 | −1+1i | −1+1i | 1+1i | 1−1i |
| 0 1 1 0 0 0 0 0 | −1+1i | 1−1i | −1−1i | −1−1i |
| 0 1 1 0 0 0 1 0 | −1+1i | 1−1i | −1−1i | 1−1i |
| 0 1 1 0 0 1 0 1 | −1+1i | 1−1i | −1+1i | −1+1i |
| 0 1 1 0 0 1 1 1 | −1+1i | 1−1i | −1+1i | 1+1i |
| 0 1 1 0 1 0 0 0 | −1+1i | 1−1i | 1−1i | −1−1i |
| 0 1 1 0 1 0 1 0 | −1+1i | 1−1i | 1−1i | 1−1i |
| 0 1 1 0 1 1 0 1 | −1+1i | 1−1i | 1+1i | −1+1i |

-continued

| Labelling (from left to right) 7 bits b1 . . . b7, and 1 overhead bit b' | Time slot T$_1$ | | Time slot T$_2$ | |
|---|---|---|---|---|
| | X polarization | Y polarization | X polarization | Y polarization |
| 0 1 1 0 1 1 1 1 | −1+1i | 1−1i | 1+1i | 1+1i |
| 0 1 1 1 0 0 0 0 | −1+1i | 1+1i | −1−1i | −1−1i |
| 0 1 1 1 0 0 1 0 | −1+1i | 1+1i | −1−1i | 1−1i |
| 0 1 1 1 0 1 0 0 | −1+1i | 1+1i | −1+1i | −1−1i |
| 0 1 1 1 0 1 1 0 | −1+1i | 1+1i | −1+1i | 1−1i |
| 0 1 1 1 1 0 0 1 | −1+1i | 1+1i | 1−1i | −1+1i |
| 0 1 1 1 1 0 1 1 | −1+1i | 1+1i | 1−1i | 1+1i |
| 0 1 1 1 1 1 0 1 | −1+1i | 1+1i | 1+1i | −1+1i |
| 0 1 1 1 1 1 1 1 | −1+1i | 1+1i | 1+1i | 1+1i |
| 1 0 0 0 0 0 0 0 | 1−1i | −1−1i | −1−1i | −1−1i |
| 1 0 0 0 0 0 1 0 | 1−1i | −1−1i | −1−1i | 1−1i |
| 1 0 0 0 0 1 0 0 | 1−1i | −1−1i | −1+1i | −1−1i |
| 1 0 0 0 0 1 1 0 | 1−1i | −1−1i | −1+1i | 1−1i |
| 1 0 0 0 1 0 0 1 | 1−1i | −1−1i | 1−1i | −1+1i |
| 1 0 0 0 1 0 1 1 | 1−1i | −1−1i | 1−1i | 1+1i |
| 1 0 0 0 1 1 0 1 | 1−1i | −1−1i | 1+1i | −1+1i |
| 1 0 0 0 1 1 1 1 | 1−1i | −1−1i | 1+1i | 1+1i |
| 1 0 0 1 0 0 0 0 | 1−1i | −1+1i | −1−1i | −1−1i |
| 1 0 0 1 0 0 1 0 | 1−1i | −1+1i | −1−1i | 1−1i |
| 1 0 0 1 0 1 0 1 | 1−1i | −1+1i | −1+1i | −1+1i |
| 1 0 0 1 0 1 1 1 | 1−1i | −1+1i | −1+1i | 1+1i |
| 1 0 0 1 1 0 0 0 | 1−1i | −1+1i | 1−1i | −1−1i |
| 1 0 0 1 1 0 1 0 | 1−1i | −1+1i | 1−1i | 1−1i |
| 1 0 0 1 1 1 0 1 | 1−1i | −1+1i | 1+1i | −1+1i |
| 1 0 0 1 1 1 1 1 | 1−1i | −1+1i | 1+1i | 1+1i |
| 1 0 1 0 0 0 0 1 | 1−1i | 1−1i | −1−1i | −1+1i |
| 1 0 1 0 0 0 1 1 | 1−1i | 1−1i | −1−1i | 1+1i |
| 1 0 1 0 0 1 0 0 | 1−1i | 1−1i | −1+1i | −1−1i |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 0 1 0 1 1 | 1−1i | 1−1i | 1−1i | 1+1i |
| 1 0 1 0 1 1 0 0 | 1−1i | 1−1i | 1+1i | −1−1i |
| 1 0 1 0 1 1 1 0 | 1−1i | 1−1i | 1+1i | 1−1i |
| 1 0 1 1 0 0 0 1 | 1−1i | 1+1i | −1−1i | −1+1i |
| 1 0 1 1 0 0 1 1 | 1−1i | 1+1i | −1−1i | 1+1i |
| 1 0 1 1 0 1 0 1 | 1−1i | 1+1i | −1+1i | −1+1i |
| 1 0 1 1 0 1 1 1 | 1−1i | 1+1i | −1+1i | 1+1i |
| 1 0 1 1 1 0 0 0 | 1−1i | 1+1i | 1−1i | −1−1i |
| 1 0 1 1 1 0 1 0 | 1−1i | 1+1i | 1−1i | 1−1i |
| 1 0 1 1 1 1 0 0 | 1−1i | 1+1i | 1+1i | −1−1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 0 0 1 0 | 1+1i | −1−1i | −1−1i | 1−1i |
| 1 1 0 0 0 1 0 1 | 1+1i | −1−1i | −1+1i | −1+1i |
| 1 1 0 0 0 1 1 1 | 1+1i | −1−1i | −1+1i | 1+1i |
| 1 1 0 0 1 0 0 0 | 1+1i | −1−1i | 1−1i | −1−1i |
| 1 1 0 0 1 0 1 0 | 1+1i | −1−1i | 1−1i | 1−1i |
| 1 1 0 0 1 1 0 1 | 1+1i | −1−1i | 1+1i | −1+1i |
| 1 1 0 0 1 1 1 1 | 1+1i | −1−1i | 1+1i | 1+1i |
| 1 1 0 1 0 0 0 1 | 1+1i | −1+1i | −1−1i | −1+1i |
| 1 1 0 1 0 0 1 1 | 1+1i | −1+1i | −1−1i | 1+1i |
| 1 1 0 1 0 1 0 1 | 1+1i | −1+1i | −1+1i | −1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 0 1 1 0 1 0 | 1+1i | −1+1i | 1−1i | 1−1i |
| 1 1 0 1 1 1 0 0 | 1+1i | −1+1i | 1+1i | −1−1i |
| 1 1 0 1 1 1 1 0 | 1+1i | −1+1i | 1+1i | 1−1i |
| 1 1 1 0 0 0 0 0 | 1+1i | 1−1i | −1−1i | −1−1i |
| 1 1 1 0 0 0 1 0 | 1+1i | 1−1i | −1−1i | 1−1i |
| 1 1 1 0 0 1 0 0 | 1+1i | 1−1i | −1+1i | −1−1i |
| 1 1 1 0 0 1 1 0 | 1+1i | 1−1i | −1+1i | 1−1i |
| 1 1 1 0 1 0 0 1 | 1+1i | 1−1i | 1−1i | −1+1i |
| 1 1 1 0 1 0 1 1 | 1+1i | 1−1i | 1−1i | 1+1i |
| 1 1 1 0 1 1 0 1 | 1+1i | 1−1i | 1+1i | −1+1i |
| 1 1 1 0 1 1 1 1 | 1+1i | 1−1i | 1+1i | 1+1i |
| 1 1 1 1 0 0 0 1 | 1+1i | 1+1i | −1−1i | −1+1i |
| 1 1 1 1 0 0 1 1 | 1+1i | 1+1i | −1−1i | 1+1i |
| 1 1 1 1 0 1 0 0 | 1+1i | 1+1i | −1+1i | −1−1i |
| 1 1 1 1 0 1 1 0 | 1+1i | 1+1i | −1+1i | 1−1i |
| 1 1 1 1 1 0 0 1 | 1+1i | 1+1i | 1−1i | −1+1i |
| 1 1 1 1 1 0 1 1 | 1+1i | 1+1i | 1−1i | 1+1i |
| 1 1 1 1 1 1 0 0 | 1+1i | 1+1i | 1+1i | −1−1i |
| 1 1 1 1 1 1 1 0 | 1+1i | 1+1i | 1+1i | 1−1i |

The above-given table and formulas define the modulation format according to the previous implementation forms up to symmetries and change of labels, which lead to formats with the same performance.

According to the above implementation forms, the modulation format at the spectral efficiency of 3.5 bits/interval in 8D is realized, which has better linear performance than the conventional solution with the same spectral efficiency. In particular, the modulation format has better linear and nonlinear performance. This is due to the fact that the constellation of the four symbols used in the first aspect has a higher Euclidian distance, which gives better linear performance.

In a further implementation form of the first aspect, the encoder is configured to multiply each symbol selected from the set of four symbols $-1-1i$, $-1+1i$, $1-1i$ and $1+1i$ by a real number.

Multiplying all symbols by a real number still obtains a modulation format with the desired properties. In particular, multiplying a QPSK symbol with a real number does not change the polarization states. Depending on the implementation, the multiplication may not have an effect, or may simply change the transmission power.

A second aspect of the disclosure provides an optical transmission system, comprising the optical transmitter according to the first aspect as such or any implementation form of the first aspect, and an optical receiver for receiving the data signal, wherein the optical receiver is configured to receive and decode the modulated carrier waves of the optical carrier to obtain the data signal.

The optical transmission system of the second aspect achieves all advantages and effects of the optical transmitter of the first aspect.

A third aspect of the disclosure provides a method of optically transmitting a data signal, comprising encoding the data signal by selecting based on a bit sequence a first symbol and a second symbol from a set of four symbols for each one of at least two transmission time slots, and using in each transmission time slot the first symbol to modulate a first carrier wave and the second symbol to modulate a second carrier wave, and transmitting the two carrier waves over orthogonal polarizations of an optical carrier, wherein symbols in consecutive transmission time slots have non-identical polarization states.

In an implementation form of the third aspect, the method comprises selecting the symbols from a QPSK base constellation.

In a further implementation form of the third aspect, the method comprises modulating an In-Phase and a Quadrature component of each carrier wave.

In a further implementation form of the third aspect, symbols in at least a subset of consecutive transmission time slots have anti-parallel polarization states.

In a further implementation form of the third aspect, the method further comprises generating the bit sequence based on the data signal, and the data signal comprises less bits than the bit sequence.

In a further implementation form of the third aspect, the method comprises performing at least one arithmetic operation based on at least two bits of the data signal to obtain at least one overhead bit, and to generate the bit sequence based on the bits of the data signal and at least one overhead bit.

In a further implementation form of the third aspect, the method comprises transmitting the data signal with a spectral efficiency of 2.5 bits per transmission time slot.

In a further implementation form of the third aspect, the symbol polarization states in each transmission time slot take one of at least four distinct polarizations states.

In a further implementation form of the third aspect, the data signal has five bits $b1 \ldots b5$, and the method comprises generating the bit sequence having eight bits $b1 \ldots b5$, $b1'$, $b2'$, $b3'$, wherein three overhead bits $b1'$, $b2'$, $b3'$ are generated according to $$b1' = b3 \text{ XOR } b4 \text{ XOR } b5$$

$$b2' = \overline{b2} \text{ XOR } b4 \text{ XOR } b5$$

$$b3' = \overline{b1} \text{ XOR } b4 \text{ XOR } b5$$

In a further implementation form of the third aspect, for two consecutive transmission time slots T1 and T2, for two orthogonal polarizations X and Y of the optical carrier, and for a set of four QPSK symbols denoted $-1-1i$, $-1+1i$, $1-1i$ and $1+1i$, the method comprises selecting the symbols based on the data signal according to the following labelling:

| Labelling (from left to right) 5 bits $b1 \ldots b5$, and 3 overhead bits $b1'$, $b2'$, $b3'$ | Time slot $T_1$ | | Time slot $T_2$ | |
|---|---|---|---|---|
| | X polarization | Y polarization | X polarization | Y polarization |
| 0 0 0 0 0 0 1 1 | $-1-1i$ | $-1-1i$ | $-1-1i$ | $1+1i$ |
| 0 0 0 0 1 1 0 0 | $-1-1i$ | $-1-1i$ | $1+1i$ | $-1-1i$ |
| 0 0 0 1 0 1 0 0 | $-1-1i$ | $-1+1i$ | $-1+1i$ | $-1-1i$ |
| 0 0 0 1 1 0 1 1 | $-1-1i$ | $-1+1i$ | $1-1i$ | $1+1i$ |
| 0 0 1 0 0 1 1 1 | $-1-1i$ | $1-1i$ | $-1+1i$ | $1+1i$ |
| 0 0 1 0 1 0 0 0 | $-1-1i$ | $1-1i$ | $1-1i$ | $-1-1i$ |
| 0 0 1 1 0 0 0 0 | $-1-1i$ | $1+1i$ | $-1-1i$ | $-1-1i$ |
| 0 0 1 1 1 1 1 1 | $-1-1i$ | $1+1i$ | $1+1i$ | $1+1i$ |
| 0 1 0 0 0 0 0 1 | $-1+1i$ | $-1-1i$ | $-1-1i$ | $-1+1i$ |
| 0 1 0 0 1 1 1 0 | $-1+1i$ | $-1-1i$ | $1+1i$ | $1-1i$ |
| 0 1 0 1 0 1 1 0 | $-1+1i$ | $-1+1i$ | $-1+1i$ | $1-1i$ |
| 0 1 0 1 1 0 0 1 | $-1+1i$ | $-1+1i$ | $1-1i$ | $-1+1i$ |
| 0 1 1 0 0 1 0 1 | $-1+1i$ | $1-1i$ | $-1+1i$ | $-1+1i$ |
| 0 1 1 0 1 0 1 0 | $-1+1i$ | $1-1i$ | $1-1i$ | $1-1i$ |
| 0 1 1 1 0 0 1 0 | $-1+1i$ | $1+1i$ | $-1-1i$ | $1-1i$ |
| 0 1 1 1 1 1 0 1 | $-1+1i$ | $1+1i$ | $1+1i$ | $-1+1i$ |
| 1 0 0 0 0 0 1 0 | $1-1i$ | $-1-1i$ | $-1-1i$ | $1-1i$ |
| 1 0 0 0 1 1 0 1 | $1-1i$ | $-1-1i$ | $1+1i$ | $-1+1i$ |
| 1 0 0 1 0 1 0 1 | $1-1i$ | $-1+1i$ | $-1+1i$ | $-1+1i$ |
| 1 0 0 1 1 0 1 0 | $1-1i$ | $-1+1i$ | $1-1i$ | $1-1i$ |

| Labelling (from left to right) 5 bits b1 ... b5, and 3 overhead bits N', b2', b3' | Time slot $T_1$ | | Time slot $T_2$ | |
|---|---|---|---|---|
| | X polarization | Y polarization | X polarization | Y polarization |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 1 0 0 0 1 | 1−1i | 1+1i | −1−1i | −1+1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 1 1 1 1 | 1+1i | −1−1i | 1+1i | 1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 1 0 0 1 0 0 | 1+1i | 1−1i | −1+1i | −1−1i |
| 1 1 1 0 1 0 1 1 | 1+1i | 1−1i | 1−1i | 1+1i |
| 1 1 1 1 0 0 1 1 | 1+1i | 1+1i | −1−1i | 1+1i |
| 1 1 1 1 1 1 0 0 | 1+1i | 1+1i | 1+1i | −1−1i |

In a further implementation form of the third aspect, the method comprises transmitting the data signal with a spectral efficiency of 3.5 bits per transmission time slot.

In a further implementation form of the third aspect, symbols in at least a subset of consecutive transmission time slots have orthogonal polarization states.

In a further implementation form of the third aspect, the data signal has seven bits b1 ... b7, and the method comprises generating the bit sequence having eight bits b1 ... b7, b', wherein the overhead bit b' is generated according to:

$b' = b1$ XOR $b4$ XOR $b6$ XOR$(b1$AND$b3)$XOR $(b1$AND$b4)$XOR$(b1$AND$b5)$XOR$(b1$AND$b6)$ XOR$(b2$AND$b3)$XOR$(b2$AND$b4)$XOR $(b2$AND$b5)$XOR$(b2$AND$b6)$XOR$(b3$AND$b5)$ XOR$(b3$AND$b6)$XOR$(b4$AND$b5)$XOR $(b4$AND$b6)$

In a further implementation form of the third aspect, for two consecutive transmission time slots T1 and T2, for two orthogonal polarizations X and Y of the optical carrier, and for a set of four QPSK symbols denoted −1−1i, −1+1i, 1−1i and 1+1i, the method comprises selecting the symbols based on the data signal according to the following labelling:

| Labelling (from left to right) 7 bits b1 ... b7, and 1 overhead bit b' | Time slot $T_1$ | | Time slot $T_2$ | |
|---|---|---|---|---|
| | X polarization | Y polarization | X polarization | Y polarization |
| 0 0 0 0 0 0 0 1 | −1−1i | −1−1i | −1−1i | −1+1i |
| 0 0 0 0 0 0 1 1 | −1−1i | −1−1i | −1−1i | 1+1i |
| 0 0 0 0 0 1 0 0 | −1−1i | −1−1i | −1+1i | −1−1i |
| 0 0 0 0 0 1 1 0 | −1−1i | −1−1i | −1+1i | 1−1i |
| 0 0 0 0 1 0 0 1 | −1−1i | −1−1i | 1−1i | −1+1i |
| 0 0 0 0 1 0 1 1 | −1−1i | −1−1i | 1−1i | 1+1i |
| 0 0 0 0 1 1 0 0 | −1−1i | −1−1i | 1+1i | −1−1i |
| 0 0 0 0 1 1 1 0 | −1−1i | −1−1i | 1+1i | 1−1i |
| 0 0 0 1 0 0 0 0 | −1−1i | −1+1i | −1−1i | −1−1i |
| 0 0 0 1 0 0 1 0 | −1−1i | −1+1i | −1−1i | 1−1i |
| 0 0 0 1 0 1 0 0 | −1−1i | −1+1i | −1+1i | −1−1i |
| 0 0 0 1 0 1 1 0 | −1−1i | −1+1i | −1+1i | 1−1i |
| 0 0 0 1 1 0 0 1 | −1−1i | −1+1i | 1−1i | −1+1i |
| 0 0 0 1 1 0 1 1 | −1−1i | −1+1i | 1−1i | 1+1i |
| 0 0 0 1 1 1 0 1 | −1−1i | −1+1i | 1+1i | −1+1i |
| 0 0 0 1 1 1 1 1 | −1−1i | −1+1i | 1+1i | 1+1i |
| 0 0 1 0 0 0 0 1 | −1−1i | 1−1i | −1−1i | −1+1i |
| 0 0 1 0 0 0 1 1 | −1−1i | 1−1i | −1−1i | 1+1i |
| 0 0 1 0 0 1 0 1 | −1−1i | 1−1i | −1+1i | −1+1i |
| 0 0 1 0 0 1 1 1 | −1−1i | 1−1i | −1+1i | 1+1i |
| 0 0 1 0 1 0 0 0 | −1−1i | 1−1i | 1−1i | −1−1i |
| 0 0 1 0 1 0 1 0 | −1−1i | 1−1i | 1−1i | 1−1i |
| 0 0 1 0 1 1 0 0 | −1−1i | 1−1i | 1+1i | −1−1i |
| 0 0 1 0 1 1 1 0 | −1−1i | 1−1i | 1+1i | 1−1i |
| 0 0 1 1 0 0 0 0 | −1−1i | 1+1i | −1−1i | −1−1i |
| 0 0 1 1 0 0 1 0 | −1−1i | 1+1i | −1−1i | 1−1i |
| 0 0 1 1 0 1 0 1 | −1−1i | 1+1i | −1+1i | −1+1i |
| 0 0 1 1 0 1 1 1 | −1−1i | 1+1i | −1+1i | 1+1i |
| 0 0 1 1 1 0 0 0 | −1−1i | 1+1i | 1−1i | −1−1i |
| 0 0 1 1 1 0 1 0 | −1−1i | 1+1i | 1−1i | 1−1i |
| 0 0 1 1 1 1 0 1 | −1−1i | 1+1i | 1+1i | −1+1i |
| 0 0 1 1 1 1 1 1 | −1−1i | 1+1i | 1+1i | 1+1i |
| 0 1 0 0 0 0 0 1 | −1+1i | −1−1i | −1−1i | −1+1i |
| 0 1 0 0 0 0 1 1 | −1+1i | −1−1i | −1−1i | 1+1i |
| 0 1 0 0 0 1 0 1 | −1+1i | −1−1i | −1+1i | −1+1i |
| 0 1 0 0 0 1 1 1 | −1+1i | −1−1i | −1+1i | 1+1i |
| 0 1 0 0 1 0 0 0 | −1+1i | −1−1i | 1−1i | −1−1i |
| 0 1 0 0 1 0 1 0 | −1+1i | −1−1i | 1−1i | 1−1i |

-continued

| Labelling (from left to right) 7 bits b1 ... b7, and 1 overhead bit b' | Time slot $T_1$ | | Time slot $T_2$ | |
|---|---|---|---|---|
| | X polarization | Y polarization | X polarization | Y polarization |
| 0 1 0 0 1 1 0 0 | −1+1i | −1−1i | 1+1i | −1−1i |
| 0 1 0 0 1 1 1 0 | −1+1i | −1−1i | 1+1i | 1−1i |
| 0 1 0 1 0 0 0 1 | −1+1i | −1+1i | −1−1i | −1+1i |
| 0 1 0 1 0 0 1 1 | −1+1i | −1+1i | −1−1i | 1+1i |
| 0 1 0 1 0 1 0 0 | −1+1i | −1+1i | −1+1i | −1−1i |
| 0 1 0 1 0 1 1 0 | −1+1i | −1+1i | −1+1i | 1−1i |
| 0 1 0 1 1 0 0 1 | −1+1i | −1+1i | 1−1i | −1+1i |
| 0 1 0 1 1 0 1 1 | −1+1i | −1+1i | 1−1i | 1+1i |
| 0 1 0 1 1 1 0 0 | −1+1i | −1+1i | 1+1i | −1−1i |
| 0 1 0 1 1 1 1 0 | −1+1i | −1+1i | 1+1i | 1−1i |
| 0 1 1 0 0 0 0 0 | −1+1i | 1−1i | −1−1i | −1−1i |
| 0 1 1 0 0 0 1 0 | −1+1i | 1−1i | −1−1i | 1−1i |
| 0 1 1 0 0 1 0 1 | −1+1i | 1−1i | −1+1i | −1+1i |
| 0 1 1 0 0 1 1 1 | −1+1i | 1−1i | −1+1i | 1+1i |
| 0 1 1 0 1 0 0 0 | −1+1i | 1−1i | 1−1i | −1−1i |
| 0 1 1 0 1 0 1 0 | −1+1i | 1−1i | 1−1i | 1−1i |
| 0 1 1 0 1 1 0 1 | −1+1i | 1−1i | 1+1i | −1+1i |
| 0 1 1 0 1 1 1 1 | −1+1i | 1−1i | 1+1i | 1+1i |
| 0 1 1 1 0 0 0 0 | −1+1i | 1+1i | −1−1i | −1−1i |
| 0 1 1 1 0 0 1 0 | −1+1i | 1+1i | −1−1i | 1−1i |
| 0 1 1 1 0 1 0 0 | −1+1i | 1+1i | −1+1i | −1−1i |
| 0 1 1 1 0 1 1 0 | −1+1i | 1+1i | −1+1i | 1−1i |
| 0 1 1 1 1 0 0 1 | −1+1i | 1+1i | 1−1i | −1+1i |
| 0 1 1 1 1 0 1 1 | −1+1i | 1+1i | 1−1i | 1+1i |
| 0 1 1 1 1 1 0 1 | −1+1i | 1+1i | 1+1i | −1+1i |
| 0 1 1 1 1 1 1 1 | −1+1i | 1+1i | 1+1i | 1+1i |
| 1 0 0 0 0 0 0 0 | 1−1i | −1−1i | −1−1i | −1−1i |
| 1 0 0 0 0 0 1 0 | 1−1i | −1−1i | −1−1i | 1−1i |
| 1 0 0 0 0 1 0 0 | 1−1i | −1−1i | −1+1i | −1−1i |
| 1 0 0 0 0 1 1 0 | 1−1i | −1−1i | −1+1i | 1−1i |
| 1 0 0 0 1 0 0 1 | 1−1i | −1−1i | 1−1i | −1+1i |
| 1 0 0 0 1 0 1 1 | 1−1i | −1−1i | 1−1i | 1+1i |
| 1 0 0 0 1 1 0 1 | 1−1i | −1−1i | 1+1i | −1+1i |
| 1 0 0 0 1 1 1 1 | 1−1i | −1−1i | 1+1i | 1+1i |
| 1 0 0 1 0 0 0 0 | 1−1i | −1+1i | −1−1i | −1−1i |
| 1 0 0 1 0 0 1 0 | 1−1i | −1+1i | −1−1i | 1−1i |
| 1 0 0 1 0 1 0 1 | 1−1i | −1+1i | −1+1i | −1+1i |
| 1 0 0 1 0 1 1 1 | 1−1i | −1+1i | −1+1i | 1+1i |
| 1 0 0 1 1 0 0 0 | 1−1i | −1+1i | 1−1i | −1−1i |
| 1 0 0 1 1 0 1 0 | 1−1i | −1+1i | 1−1i | 1−1i |
| 1 0 0 1 1 1 0 1 | 1−1i | −1+1i | 1+1i | −1+1i |
| 1 0 0 1 1 1 1 1 | 1−1i | −1+1i | 1+1i | 1+1i |
| 1 0 1 0 0 0 0 1 | 1−1i | 1−1i | −1−1i | −1+1i |
| 1 0 1 0 0 0 1 1 | 1−1i | 1−1i | −1−1i | 1+1i |
| 1 0 1 0 0 1 0 0 | 1−1i | 1−1i | −1+1i | −1−1i |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 0 1 0 1 1 | 1−1i | 1−1i | 1−1i | 1+1i |
| 1 0 1 0 1 1 0 0 | 1−1i | 1−1i | 1+1i | −1−1i |
| 1 0 1 0 1 1 1 0 | 1−1i | 1−1i | 1+1i | 1−1i |
| 1 0 1 1 0 0 0 1 | 1−1i | 1+1i | −1−1i | −1+1i |
| 1 0 1 1 0 0 1 1 | 1−1i | 1+1i | −1−1i | 1+1i |
| 1 0 1 1 0 1 0 1 | 1−1i | 1+1i | −1+1i | −1+1i |
| 1 0 1 1 0 1 1 1 | 1−1i | 1+1i | −1+1i | 1+1i |
| 1 0 1 1 1 0 0 0 | 1−1i | 1+1i | 1−1i | −1−1i |
| 1 0 1 1 1 0 1 0 | 1−1i | 1+1i | 1−1i | 1−1i |
| 1 0 1 1 1 1 0 0 | 1−1i | 1+1i | 1+1i | −1−1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 0 0 1 0 | 1+1i | −1−1i | −1−1i | 1−1i |
| 1 1 0 0 0 1 0 1 | 1+1i | −1−1i | −1+1i | −1+1i |
| 1 1 0 0 0 1 1 1 | 1+1i | −1−1i | −1+1i | 1+1i |
| 1 1 0 0 1 0 0 0 | 1+1i | −1−1i | 1−1i | −1−1i |
| 1 1 0 0 1 0 1 0 | 1+1i | −1−1i | 1−1i | 1−1i |
| 1 1 0 0 1 1 0 1 | 1+1i | −1−1i | 1+1i | −1+1i |
| 1 1 0 0 1 1 1 1 | 1+1i | −1−1i | 1+1i | 1+1i |
| 1 1 0 1 0 0 0 1 | 1+1i | −1+1i | −1−1i | −1+1i |
| 1 1 0 1 0 0 1 1 | 1+1i | −1+1i | −1−1i | 1+1i |
| 1 1 0 1 0 1 0 1 | 1+1i | −1+1i | −1+1i | −1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 0 1 1 0 1 0 | 1+1i | −1+1i | 1−1i | 1−1i |
| 1 1 0 1 1 1 0 0 | 1+1i | −1+1i | 1+1i | −1−1i |
| 1 1 0 1 1 1 1 0 | 1+1i | −1+1i | 1+1i | 1−1i |

-continued

| Labelling (from left to right) 7 bits b1 ... b7, and 1 overhead bit b' | Time slot T₁ | | Time slot T₂ | |
|---|---|---|---|---|
| | X polarization | Y polarization | X polarization | Y polarization |
| 1 1 1 0 0 0 0 0 | 1+1i | 1−1i | −1−1i | −1−1i |
| 1 1 1 0 0 0 1 0 | 1+1i | 1−1i | −1−1i | 1−1i |
| 1 1 1 0 0 1 0 0 | 1+1i | 1−1i | −1+1i | −1−1i |
| 1 1 1 0 0 1 1 0 | 1+1i | 1−1i | −1+1i | 1−1i |
| 1 1 1 0 1 0 0 1 | 1+1i | 1−1i | 1−1i | −1+1i |
| 1 1 1 0 1 0 1 1 | 1+1i | 1−1i | 1−1i | 1+1i |
| 1 1 1 0 1 1 0 1 | 1+1i | 1−1i | 1+1i | −1+1i |
| 1 1 1 0 1 1 1 1 | 1+1i | 1−1i | 1+1i | 1+1i |
| 1 1 1 1 0 0 0 1 | 1+1i | 1+1i | −1−1i | −1+1i |
| 1 1 1 1 0 0 1 1 | 1+1i | 1+1i | −1−1i | 1+1i |
| 1 1 1 1 0 1 0 0 | 1+1i | 1+1i | −1+1i | −1−1i |
| 1 1 1 1 0 1 1 0 | 1+1i | 1+1i | −1+1i | 1−1i |
| 1 1 1 1 1 0 0 1 | 1+1i | 1+1i | 1−1i | −1+1i |
| 1 1 1 1 1 0 1 1 | 1+1i | 1+1i | 1−1i | 1+1i |
| 1 1 1 1 1 1 0 0 | 1+1i | 1+1i | 1+1i | −1−1i |
| 1 1 1 1 1 1 1 0 | 1+1i | 1+1i | 1+1i | 1−1i |

In a further implementation form of the third aspect, the method comprises multiplying each symbol selected from the set of four symbols −1−1i, −1+1i, 1−1i and 1+1i by a real number.

With the method of the third aspect and its implementation forms, all advantages and effects of the optical transmitter of the first aspect and its respective implementation forms are achieved. The method may further comprise a step of receiving, demodulating and decoding the data signal at a receiver side.

A further aspect provides an optical transmitter that transmits a data signal. The optical transmitter includes an encoder and a modulator. The encoder maps a number of information bits of the data signal to a symbol in an eight-dimensional constellation space spanned by vectors IXT1, QXT1, IYT1, QYT1, IXT2, QXT2, IYT2, QYT2, wherein I and Q are in-phase and quadrature components of an optical carrier, X and Y are orthogonal polarizations of the optical carrier, and T1 and T2 are two consecutive transmission time slots, by selecting the symbol from a set of constellation points in the eight-dimensional constellation space. The modulator uses the selected symbol in the two consecutive transmission time slots T1 and T2 to modulate a first carrier wave and a second carrier wave, and to transmit the first carrier wave and the second carrier wave over the orthogonal polarizations X and Y of the optical carrier. The set of constellation points do not include any constellation point with parallel Stokes vectors in the two consecutive transmission time slots T1 and T2 and comprise one or more constellation points with orthogonal Stokes vectors in the two consecutive transmission time slots T1 and T2.

A further aspect provides a method of optically transmitting a data signal. The method includes: mapping a number of information bits of the data signal to a symbol in an eight-dimensional constellation space spanned by vectors IXT1, QXT1, IYT1, QYT1, IXT2, QXT2, IYT2, QYT2, wherein I and Q are in-phase and quadrature components of an optical carrier, X and Y are orthogonal polarizations of the optical carrier, and T1 and T2 are two consecutive transmission time slots, by selecting the symbol from a set of constellation points in the eight-dimensional constellation space; using the selected symbol in the two consecutive transmission time slots T1 and T2 to modulate a first carrier wave and a second carrier wave; and transmitting the first carrier wave and the second carrier wave over the orthogonal polarizations X and Y of the optical carrier. The set of constellation points does not include any constellation point with parallel Stokes vectors in the two consecutive transmission time slots T1 and T2 and includes one or more constellation points with orthogonal Stokes vectors in the two consecutive transmission time slots T1 and T2.

It has to be noted that all devices, elements, units, and means described in the present disclosure could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities.

Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or in any possible kind of combination of such elements.

BRIEF DESCRIPTION OF THE DRAWINGS

The above described aspects and implementation forms of the disclosure will be explained in the following description of exemplary embodiments in relation to the enclosed drawings, in which.

DETAILED DESCRIPTION OF THE EMBODIMENTS

The disclosure presents an optical transmitter 100, an optical transmission system, and a method 500, which use modulation formats obtained by set-partitioning of a constellation whose projection onto an interval is the PDM-QPSK constellation. The following constraints were applied for designing the modulation formats:

Symbols must not have identical (parallel) states of polarization in two consecutive time slots.

If possible, symbols have opposite (antiparallel) states of polarization in two consecutive time slots.

If there are not enough symbols to reach the desired spectral efficiency, then missing symbols are chosen from the set of symbols with the polarization alternating property (not identical polarization states).

The overall set of symbols are chosen to have preferably a high symmetry. More specifically, for each symbol of a given modulation format, the Euclidean distances to its neighbors is preferably chosen to be the highest possible one, with respect to what the whole PDM-QPSK constellation offers.

The modulation formats used by the optical transmitter 100, the transmission system, and the method 500 according to embodiments of the present disclosure, respectively, differ from the known modulation formats (at the same spectral efficiency) at least in that:

The modulation formats are derived from the same base constellation of a set of four symbols.

The modulation formats have the same modulus in each of the dimensions separately (this is in fact a consequence of the previous point).

The modulation formats may contain symbols with the polarization alternating property.

The modulation formats have at least four distinct polarization states.

Figure 1:
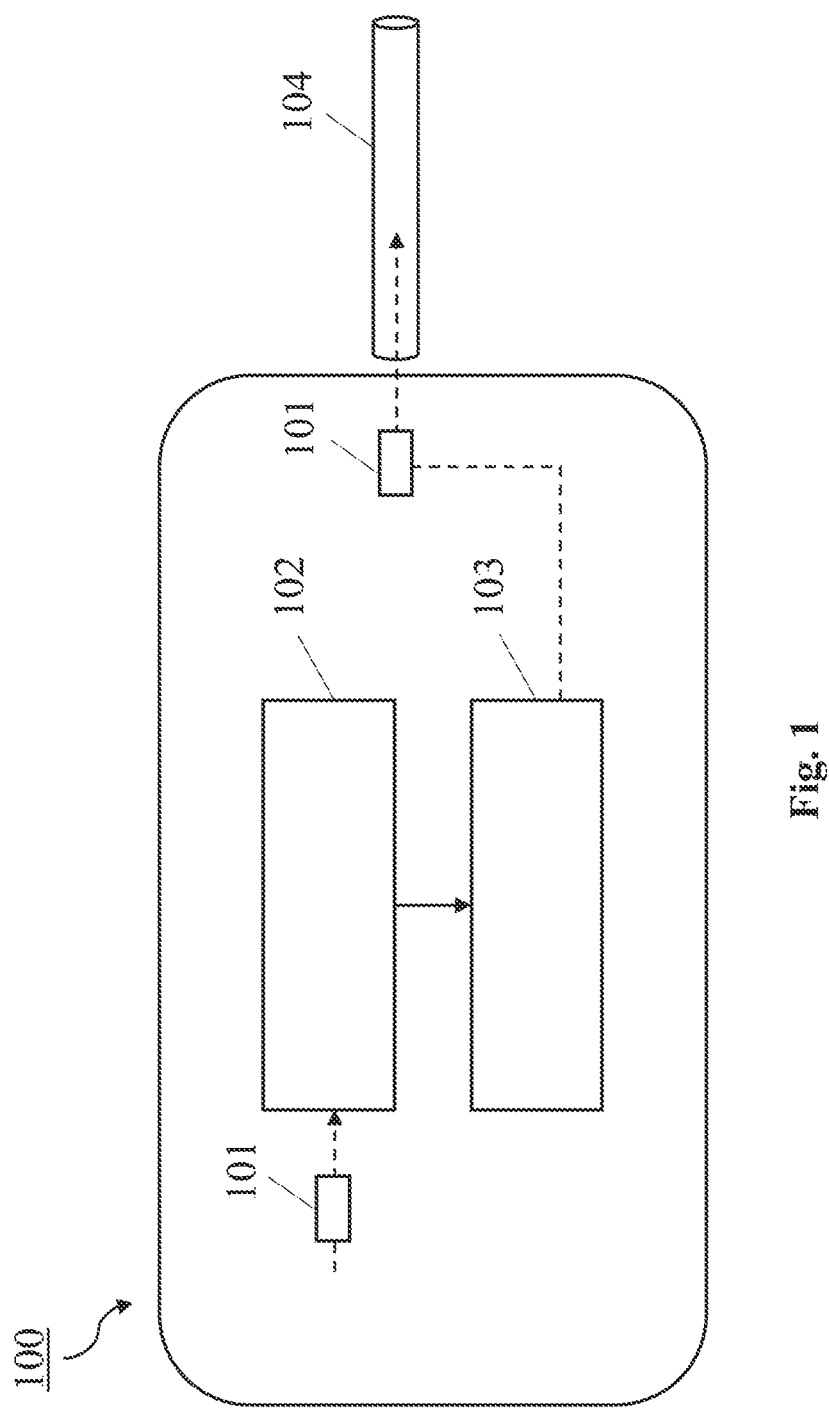
FIG. 1 shows an optical transmitter according to an exemplary embodiment of the present disclosure.

FIG. 1 shows an optical transmitter 100 according to an exemplary embodiment of the present disclosure. The optical transmitter 100 is configured to transmit a data signal 101, which comprises a sequence of bits, over an optical link like an optical carrier 104. The optical transmitter 100 comprises an encoder 102 for encoding the data signal 101, and a modulator 103 for modulating and transmitting the data signal 101 on the optical carrier 104. For instance, the optical carrier 104 may be an optical fiber.

Figure 2:
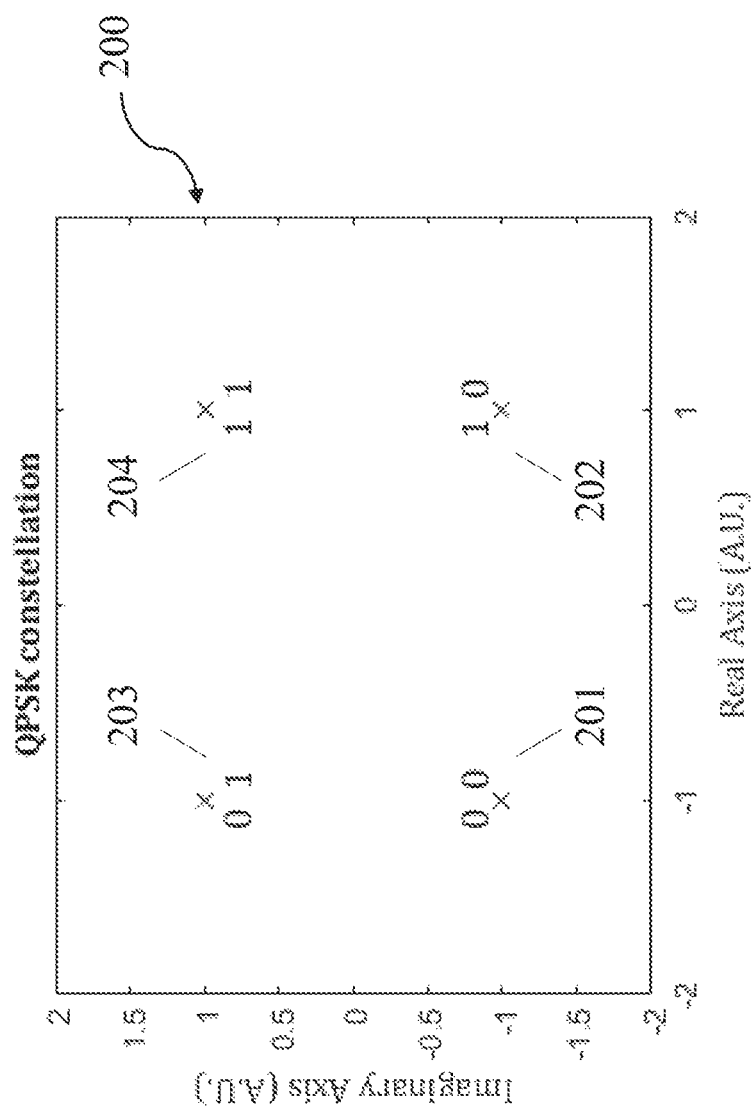
FIG. 2 shows a set of four symbols, in particular a QPSK constellation and labelling.

In particular, the encoder 102 is configured to encode the data signal 101 by selecting, based on a bit sequence, a first symbol and a second symbol from a set 200 of four symbols 201-204 (see FIG. 2), for each one of at least two transmission time slots. Notably, the bit sequence may be the bits of the data signal 101 itself or may be a bit sequence 401 derived from the data signal 101.

The modulator 103 is configured to use, in each transmission time slot, the first symbol to modulate a first carrier wave and the second symbol to modulate a second carrier wave. Further, the modulator 103 is configured to transmit the two carrier waves over orthogonal polarizations of the optical carrier 104.

Symbols 201-204 in consecutive transmission time slots have non-identical polarization states, i.e. they follow the above-described 'polarization alternating' concept. The modulation symbols 201-204 for a given polarization and time slot are preferably taken from the QPSK constellation shown in FIG. 2, providing the set 200 of four symbols 201-204. The set 200 shown in FIG. 2 includes specifically the four QPSK symbols denoted as −1−1i (symbol 201), −1+1i (symbol 203), 1−1i (symbol 202) and 1+1i (symbols 204).

Figure 3:
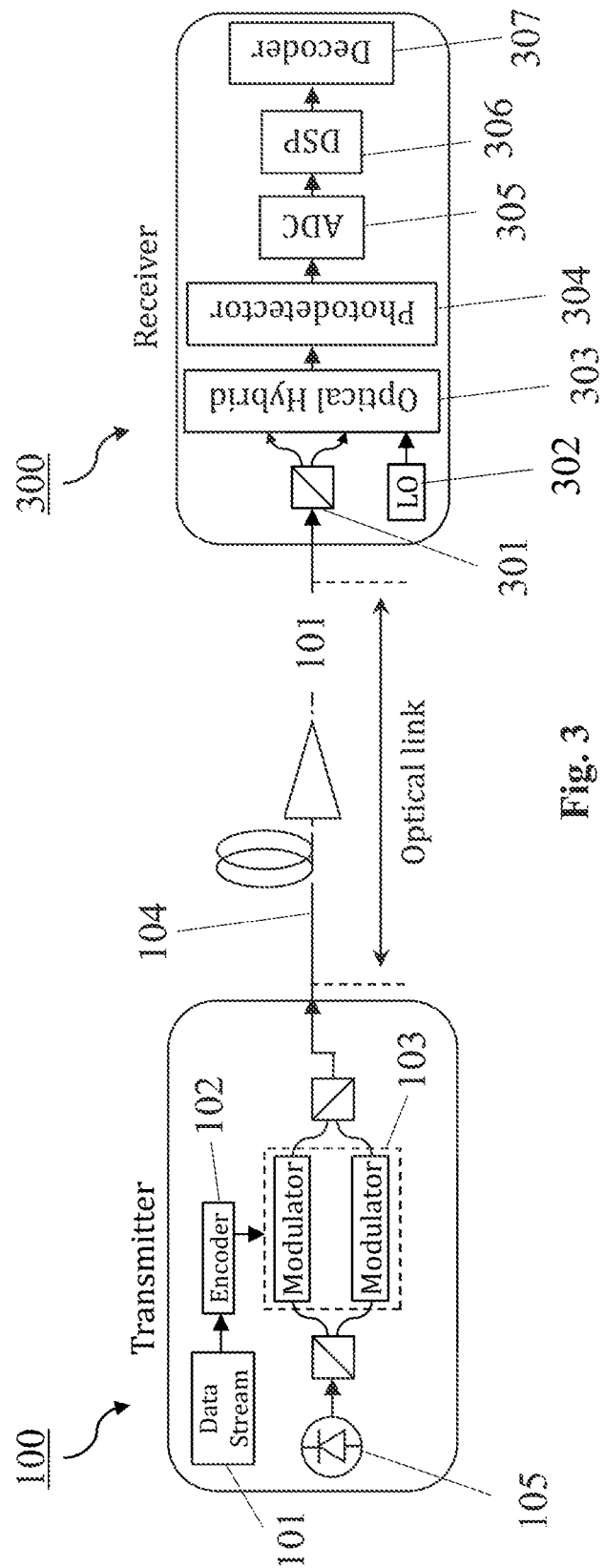
FIG. 3 shows an optical transmission system according to an exemplary embodiment of the present disclosure including an optical transmitter according to an embodiment of the present disclosure.

FIG. 3 shows an optical communication or transmission system according to an exemplary embodiment of the disclosure, in which the modulation formats may be implemented. The transmission system comprises an optical transmitter 100 according to an embodiment of the present disclosure, particularly the optical transmitter 100 shown in FIG. 1, an optical (coherent) receiver 300 for receiving the data signal 101, and an optical link (i.e. the optical carrier 104) between the transmitter 100 and receiver 300. The optical receiver 300 is particularly configured to receive and decode the modulated carrier waves of the optical carrier 104, in order to obtain the data signal 101.

In the optical transmitter 100, the encoder 102 encodes the data signal 101 and may generally generate a sequence of M drive signals from an M=4N-dimensional constellation, where N is the number of time slots. The drive signals from the encoder 102 in turn are used to drive the modulator 103, which modulates the respective dimensions onto the (X and Y) polarizations of the optical carrier 104. The modulator 103 and a laser 105 of the optical transmitter 100 may be implemented using devices known in the art.

The optical receiver 300 is preferably a coherent receiver, which includes an optical beam splitter 301 to separate the received carrier waves into X and Y polarizations. The two obtained signals are mixed separately with a local oscillator 302 and a set of photodetectors 304 detects the optical power of each of the mixed signals for each polarization generated by an optical hybrid 302. An analog to digital converter 305 (ADC) samples each current of the photodetectors 304. The sample streams, which each represent one of the modulated dimensions of the optical carrier 104, are processed in a digital signal processing 306 (DSP), which may include dispersion compensation and possibly other equalization techniques and down-sampling. The processed sample stream is further processed in a decoder 307, such that samples corresponding to the same multi-dimensional constellation symbol 201-204 are processed jointly to recover the transmitted data signal 101. Specifically, the decoder 307 in the receiver 300 performs the inverse operation of the encoder 102 in the transmitter 100.

Figure 4:
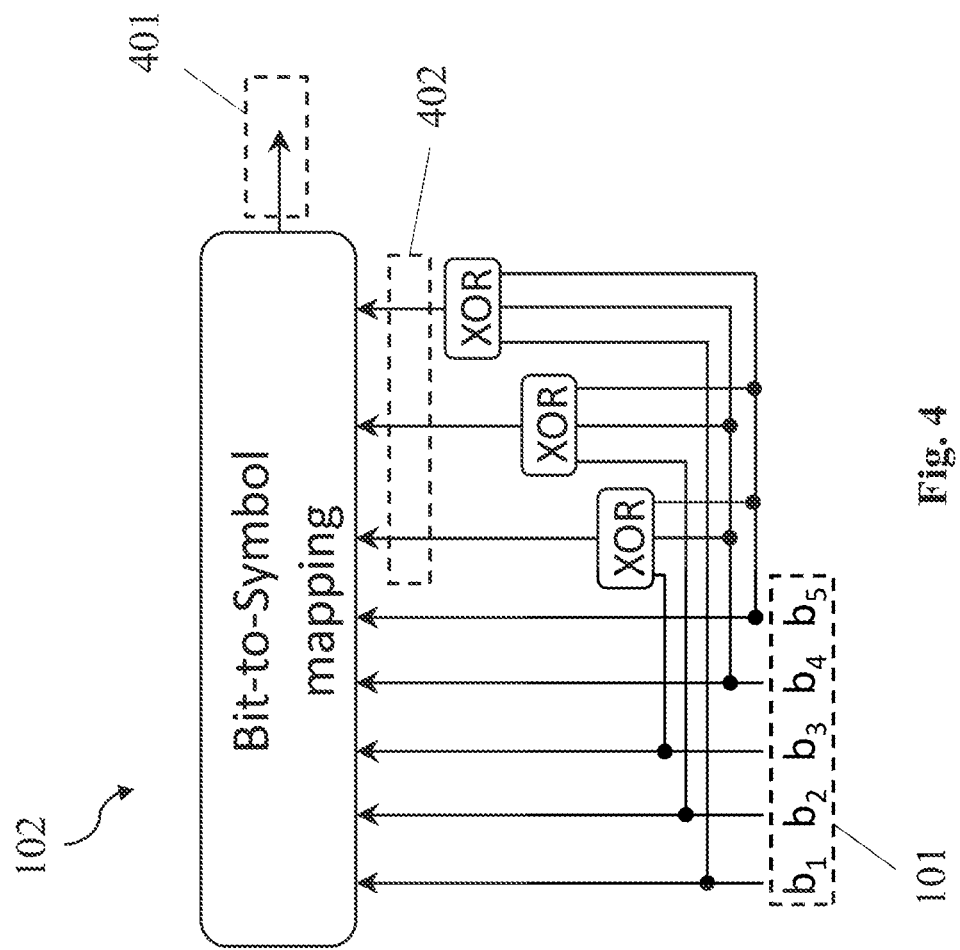
FIG. 4 shows an example encoder of an optical transmitter according to an exemplary embodiment of the present disclosure.

The modulation formats detailed in the present disclosure are implemented in the encoder 102 of the transmitter 100. An example for such an encoder 102 is shown in FIG. 4. In the encoder 102, a number of input bits, namely information bits of the data signal 101 to be transmitter, is preferably mapped to a number of output bits of a bit sequence 401. This bit sequence 401 includes a number of overhead bits 402 generated through arithmetic operations from the input bits. The output bits are then mapped to multi-dimensional output symbols 201-204 according to the labeling of the constellation points.

In the following, two refined embodiments are specifically described as examples. These embodiments define the encoder 103 and decoder 307 and correspond to two different modulation formats in 8D with spectral efficiencies of 2.5 and 3.5 bit/transmission time slot, respectively. The two modulation formats both achieve the 8D through: I and Q, two orthogonal polarizations referred to as X and Y, and two consecutive time slots referred to as $T_1$ and $T_2$. For a given polarization and time slot, the symbols 201-204 are chosen from the set of four symbols 200, preferably from the points in the I-Q-plane shown in FIG. 2.

In the first exemplary embodiment, the modulation format is defined in 8D: I, Q, polarization and two consecutive time-slots. The encoder 103 (as shown in FIG. 4) maps 5 information bits of the data signal 101, referred to as [$b_1$, $b_2$, $b_3$, $b_4$, $b_5$] to eight output bits of the bit sequence 401. Three parity or overhead bits 402, referred to as $b_1'$, $b_2'$ and $b_3'$, are defined using the following equations:

$$b1'=b3 \text{ XOR } b4 \text{ XOR } b5$$

$$b2'=\overline{b2} \text{ XOR } b4 \text{ XOR } b5$$

$$b3'=\overline{b1} \text{ XOR } b4 \text{ XOR } b5$$

Thus, the set of [$b_1$ $b_2$ $b_3$ $b_4$ $b_5$ $b_1'$ $b_2'$ $b_3'$] is finally obtained. The first two bits [$b_1$ $b_2$] are used to choose a symbol 201-204 from the set 200 shown in FIG. 2. These symbols 201-204 represent the 2 dimensions I and Q of the X polarization on the time slot $T_1$. Then, the next two bits [$b_3$ $b_4$] are used to choose a symbol 201-204 from the set 200 of FIG. 2, which symbols 201-204 represents the 2 dimensions I and Q of the Y polarization on the time slot $T_1$. The same approach is used for the bits [$b_5$ $b_1'$] and [$b_2'$ $b_3'$], respectively, selecting symbols 201-204 that represent the 2 dimensions I and Q on the time slot T2 of both X and Y polarizations, respectively. At the end, a spectral efficiency of 2.5 bits/transmission time slot (5 bits in 8 dimensions) is reached in this embodiment, and all obtained symbols 201-204 are listed in the table below. The labelling of the constellation points (the mapping from information bits of the data signal 101 to complex symbols 201-204) determines the linear channel performance.

| Labelling (from left to right) | Time slot $T_1$ | | Time slot $T_2$ | |
|---|---|---|---|---|
| 5 bits b1 ... b5, and 3 overhead bits b1', b2', b3' | X polarization | Y polarization | X polarization | Y polarization |
| 0 0 0 0 0 0 1 1 | −1−1i | −1−1i | −1−1i | 1+1i |
| 0 0 0 0 1 1 0 0 | −1−1i | −1−1i | 1+1i | −1−1i |
| 0 0 0 1 0 1 0 0 | −1−1i | −1+1i | −1+1i | −1−1i |
| 0 0 0 1 1 0 1 1 | −1−1i | −1+1i | 1−1i | 1+1i |
| 0 0 1 0 0 1 1 1 | −1−1i | 1−1i | −1+1i | 1+1i |
| 0 0 1 0 1 0 0 0 | −1−1i | 1−1i | 1−1i | −1−1i |
| 0 0 1 1 0 0 0 0 | −1−1i | 1+1i | −1−1i | −1−1i |
| 0 0 1 1 1 1 1 1 | −1−1i | 1+1i | 1+1i | 1+1i |
| 0 1 0 0 0 0 0 1 | −1+1i | −1−1i | −1−1i | −1+1i |
| 0 1 0 0 1 1 1 0 | −1+1i | −1−1i | 1+1i | 1−1i |
| 0 1 0 1 0 1 1 0 | −1+1i | −1+1i | −1+1i | 1−1i |
| 0 1 0 1 1 0 0 1 | −1+1i | −1+1i | 1−1i | −1+1i |
| 0 1 1 0 0 1 0 1 | −1+1i | 1−1i | −1+1i | −1+1i |
| 0 1 1 0 1 0 1 0 | −1+1i | 1−1i | 1−1i | 1−1i |
| 0 1 1 1 0 0 1 0 | −1+1i | 1+1i | −1−1i | 1−1i |
| 0 1 1 1 1 1 0 1 | −1+1i | 1+1i | 1+1i | −1+1i |
| 1 0 0 0 0 0 1 0 | 1−1i | −1−1i | −1−1i | 1−1i |
| 1 0 0 0 1 1 0 1 | 1−1i | −1−1i | 1+1i | −1+1i |
| 1 0 0 1 0 1 0 1 | 1−1i | −1+1i | −1+1i | −1+1i |
| 1 0 0 1 1 0 1 0 | 1−1i | −1+1i | 1−1i | 1−1i |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 1 0 0 0 1 | 1−1i | 1+1i | −1−1i | −1+1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 1 1 1 1 | 1+1i | −1−1i | 1+1i | 1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 1 0 0 1 0 0 | 1+1i | 1−1i | −1+1i | −1−1i |
| 1 1 1 0 1 0 1 1 | 1+1i | 1−1i | 1−1i | 1+1i |
| 1 1 1 1 0 0 1 1 | 1+1i | 1+1i | −1−1i | 1+1i |
| 1 1 1 1 1 1 0 0 | 1+1i | 1+1i | 1+1i | −1−1i |

These symbols 201-204 have an overall of 4 possible states of polarization with the condition that the state of polarization in $T_2$ is opposite to the one of $T_1$. The constellation has a high symmetry. The structure is such that the each constellation point has the same number of neighbors. The neighbors are located at 4 different Euclidean distances, as shown on the following table.

| Euclidean Distance | Number of neighboring symbols |
|---|---|
| 2.82 | 4 |
| 4 | 22 |
| 4.89 | 4 |
| 5.65 | 1 |

The above table shows that every point of the constellation has 4, 22, 4 and 1 symbols at Euclidean distances of 2.82, 4, 4.89 and 5.65, respectively.

In the second exemplary embodiment, the modulation format is defined in 8D: I, Q, polarization and two consecutive time slots. To map bits into symbols 201-204, the following approach is used: from 7 information bits of the data signal 101, referred to as [$b_1$, $b_2$, $b_3$, $b_4$, $b_5$, $b_6$, $b_7$], one overhead bit (b') is obtained using the following equation:

$$b1'=\overline{b1} \text{ XOR } b4 \text{ XOR } b6 \text{ XOR}(b1 \text{ XOR } b2)\text{AND}(b3 \text{ XOR } b4 \text{ XOR } b5 \text{ XOR } b6)\text{XOR}(b3 \text{ XOR } b4)\text{AND}(b5 \text{ XOR } b6)$$

Thus, the set of [$b_1$, $b_2$, $b_3$, $b_4$, $b_5$, $b_6$, $b_7$, b'] is obtained. The mapping is then done as follows. The first two bits [$b_1$ $b_2$] are used to select a symbol 201-204 from the set 200 (QPSK constellation) shown in FIG. 2. These symbols represents the 2 dimensions I and Q of the X polarization on the time slot $T_1$. Using the same approach, I and Q symbols of Y polarization on $T_1$, X polarization on $T_2$ and finally Y polarization on $T_2$ are obtained using the bits [$b_3$ $b_4$], [$b_5$ $b_6$] and finally [$b_7$ b'], respectively. At the end, a spectral efficiency of 3.5 bits/transmission time slot (7 bits in 8 dimensions) is reached, and all obtained symbols 201-204 are given in the following table. The labelling (mapping from bits to symbols 201-204) of each symbol 201-204 is given in the table as well, because as mentioned before, different labelling may result on different linear channel performance (except for equivalent constellations related by symmetry).

| Labelling (from left to right) | Time slot $T_1$ | | Time slot $T_2$ | |
|---|---|---|---|---|
| 7 bits b1 ... b7, and 1 overhead bit b' | X polarization | Y polarization | X polarization | Y polarization |
| 0 0 0 0 0 0 0 1 | −1−1i | −1−1i | −1−1i | −1+1i |
| 0 0 0 0 0 0 1 1 | −1−1i | −1−1i | −1−1i | 1+1i |
| 0 0 0 0 0 1 0 0 | −1−1i | −1−1i | −1+1i | −1−1i |
| 0 0 0 0 0 1 1 0 | −1−1i | −1−1i | −1+1i | 1−1i |
| 0 0 0 0 1 0 0 1 | −1−1i | −1−1i | 1−1i | −1+1i |
| 0 0 0 0 1 0 1 1 | −1−1i | −1−1i | 1−1i | 1+1i |
| 0 0 0 0 1 1 0 0 | −1−1i | −1−1i | 1+1i | −1−1i |
| 0 0 0 0 1 1 1 0 | −1−1i | −1−1i | 1+1i | 1−1i |
| 0 0 0 1 0 0 0 0 | −1−1i | −1+1i | −1−1i | −1−1i |
| 0 0 0 1 0 0 1 0 | −1−1i | −1+1i | −1−1i | 1−1i |
| 0 0 0 1 0 1 0 0 | −1−1i | −1+1i | −1+1i | −1−1i |
| 0 0 0 1 0 1 1 0 | −1−1i | −1+1i | −1+1i | 1−1i |
| 0 0 0 1 1 0 0 1 | −1−1i | −1+1i | 1−1i | −1+1i |
| 0 0 0 1 1 0 1 1 | −1−1i | −1+1i | 1−1i | 1+1i |
| 0 0 0 1 1 1 0 1 | −1−1i | −1+1i | 1+1i | −1+1i |
| 0 0 0 1 1 1 1 1 | −1−1i | −1+1i | 1+1i | 1+1i |
| 0 0 1 0 0 0 0 1 | −1−1i | 1−1i | −1−1i | −1+1i |
| 0 0 1 0 0 0 1 1 | −1−1i | 1−1i | −1−1i | 1+1i |
| 0 0 1 0 0 1 0 1 | −1−1i | 1−1i | −1+1i | −1+1i |
| 0 0 1 0 0 1 1 1 | −1−1i | 1−1i | −1+1i | 1+1i |
| 0 0 1 0 1 0 0 0 | −1−1i | 1−1i | 1−1i | −1−1i |
| 0 0 1 0 1 0 1 0 | −1−1i | 1−1i | 1−1i | 1−1i |

-continued

| Labelling (from left to right) 7 bits b1 ... b7, and 1 overhead bit b' | Time slot $T_1$ | | Time slot $T_2$ | |
|---|---|---|---|---|
| | X polarization | Y polarization | X polarization | Y polarization |
| 0 0 1 0 1 1 0 0 | −1−1i | 1−1i | 1+1i | −1−1i |
| 0 0 1 0 1 1 1 0 | −1−1i | 1−1i | 1+1i | 1−1i |
| 0 0 1 1 0 0 0 0 | −1−1i | 1+1i | −1−1i | −1−1i |
| 0 0 1 1 0 0 1 0 | −1−1i | 1+1i | −1−1i | 1−1i |
| 0 0 1 1 0 1 0 1 | −1−1i | 1+1i | −1+1i | −1+1i |
| 0 0 1 1 0 1 1 1 | −1−1i | 1+1i | −1+1i | 1+1i |
| 0 0 1 1 1 0 0 0 | −1−1i | 1+1i | 1−1i | −1−1i |
| 0 0 1 1 1 0 1 0 | −1−1i | 1+1i | 1−1i | 1−1i |
| 0 0 1 1 1 1 0 1 | −1−1i | 1+1i | 1+1i | −1+1i |
| 0 0 1 1 1 1 1 1 | −1−1i | 1+1i | 1+1i | 1+1i |
| 0 1 0 0 0 0 0 1 | −1+1i | −1−1i | −1−1i | −1+1i |
| 0 1 0 0 0 0 1 1 | −1+1i | −1−1i | −1−1i | 1+1i |
| 0 1 0 0 0 1 0 1 | −1+1i | −1−1i | −1+1i | −1+1i |
| 0 1 0 0 0 1 1 1 | −1+1i | −1−1i | −1+1i | 1+1i |
| 0 1 0 0 1 0 0 0 | −1+1i | −1−1i | 1−1i | −1−1i |
| 0 1 0 0 1 0 1 0 | −1+1i | −1−1i | 1−1i | 1−1i |
| 0 1 0 0 1 1 0 0 | −1+1i | −1−1i | 1+1i | −1−1i |
| 0 1 0 0 1 1 1 0 | −1+1i | −1−1i | 1+1i | 1−1i |
| 0 1 0 1 0 0 0 1 | −1+1i | −1+1i | −1−1i | −1+1i |
| 0 1 0 1 0 0 1 1 | −1+1i | −1+1i | −1−1i | 1+1i |
| 0 1 0 1 0 1 0 0 | −1+1i | −1+1i | −1+1i | −1−1i |
| 0 1 0 1 0 1 1 0 | −1+1i | −1+1i | −1+1i | 1−1i |
| 0 1 0 1 1 0 0 1 | −1+1i | −1+1i | 1−1i | −1+1i |
| 0 1 0 1 1 0 1 1 | −1+1i | −1+1i | 1−1i | 1+1i |
| 0 1 0 1 1 1 0 0 | −1+1i | −1+1i | 1+1i | −1−1i |
| 0 1 0 1 1 1 1 0 | −1+1i | −1+1i | 1+1i | 1−1i |
| 0 1 1 0 0 0 0 0 | −1+1i | 1−1i | −1−1i | −1−1i |
| 0 1 1 0 0 0 1 0 | −1+1i | 1−1i | −1−1i | 1−1i |
| 0 1 1 0 0 1 0 1 | −1+1i | 1−1i | −1+1i | −1+1i |
| 0 1 1 0 0 1 1 1 | −1+1i | 1−1i | −1+1i | 1+1i |
| 0 1 1 0 1 0 0 0 | −1+1i | 1−1i | 1−1i | −1−1i |
| 0 1 1 0 1 0 1 0 | −1+1i | 1−1i | 1−1i | 1−1i |
| 0 1 1 0 1 1 0 1 | −1+1i | 1−1i | 1+1i | −1+1i |
| 0 1 1 0 1 1 1 1 | −1+1i | 1−1i | 1+1i | 1+1i |
| 0 1 1 1 0 0 0 0 | −1+1i | 1+1i | −1−1i | −1−1i |
| 0 1 1 1 0 0 1 0 | −1+1i | 1+1i | −1−1i | 1−1i |
| 0 1 1 1 0 1 0 0 | −1+1i | 1+1i | −1+1i | −1−1i |
| 0 1 1 1 0 1 1 0 | −1+1i | 1+1i | −1+1i | 1−1i |
| 0 1 1 1 1 0 0 1 | −1+1i | 1+1i | 1−1i | −1+1i |
| 0 1 1 1 1 0 1 1 | −1+1i | 1+1i | 1−1i | 1+1i |
| 0 1 1 1 1 1 0 1 | −1+1i | 1+1i | 1+1i | −1+1i |
| 0 1 1 1 1 1 1 1 | −1+1i | 1+1i | 1+1i | 1+1i |
| 1 0 0 0 0 0 0 0 | 1−1i | −1−1i | −1−1i | −1−1i |
| 1 0 0 0 0 0 1 0 | 1−1i | −1−1i | −1−1i | 1−1i |
| 1 0 0 0 0 1 0 0 | 1−1i | −1−1i | −1+1i | −1−1i |
| 1 0 0 0 0 1 1 0 | 1−1i | −1−1i | −1+1i | 1−1i |
| 1 0 0 0 1 0 0 1 | 1−1i | −1−1i | 1−1i | −1+1i |
| 1 0 0 0 1 0 1 1 | 1−1i | −1−1i | 1−1i | 1+1i |
| 1 0 0 0 1 1 0 1 | 1−1i | −1−1i | 1+1i | −1+1i |
| 1 0 0 0 1 1 1 1 | 1−1i | −1−1i | 1+1i | 1+1i |
| 1 0 0 1 0 0 0 0 | 1−1i | −1+1i | −1−1i | −1−1i |
| 1 0 0 1 0 0 1 0 | 1−1i | −1+1i | −1−1i | 1−1i |
| 1 0 0 1 0 1 0 1 | 1−1i | −1+1i | −1+1i | −1+1i |
| 1 0 0 1 0 1 1 1 | 1−1i | −1+1i | −1+1i | 1+1i |
| 1 0 0 1 1 0 0 0 | 1−1i | −1+1i | 1−1i | −1−1i |
| 1 0 0 1 1 0 1 0 | 1−1i | −1+1i | 1−1i | 1−1i |
| 1 0 0 1 1 1 0 1 | 1−1i | −1+1i | 1+1i | −1+1i |
| 1 0 0 1 1 1 1 1 | 1−1i | −1+1i | 1+1i | 1+1i |
| 1 0 1 0 0 0 0 1 | 1−1i | 1−1i | −1−1i | −1+1i |
| 1 0 1 0 0 0 1 1 | 1−1i | 1−1i | −1−1i | 1+1i |
| 1 0 1 0 0 1 0 0 | 1−1i | 1−1i | −1+1i | −1−1i |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 0 1 0 1 1 | 1−1i | 1−1i | 1−1i | 1+1i |
| 1 0 1 0 1 1 0 0 | 1−1i | 1−1i | 1+1i | −1−1i |
| 1 0 1 0 1 1 1 0 | 1−1i | 1−1i | 1+1i | 1−1i |
| 1 0 1 1 0 0 0 1 | 1−1i | 1+1i | −1−1i | −1+1i |
| 1 0 1 1 0 0 1 1 | 1−1i | 1+1i | −1−1i | 1+1i |
| 1 0 1 1 0 1 0 1 | 1−1i | 1+1i | −1+1i | −1+1i |
| 1 0 1 1 0 1 1 1 | 1−1i | 1+1i | −1+1i | 1+1i |
| 1 0 1 1 1 0 0 0 | 1−1i | 1+1i | 1−1i | −1−1i |
| 1 0 1 1 1 0 1 0 | 1−1i | 1+1i | 1−1i | 1−1i |
| 1 0 1 1 1 1 0 0 | 1−1i | 1+1i | 1+1i | −1−1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 0 0 1 0 | 1+1i | −1−1i | −1−1i | 1−1i |
| 1 1 0 0 0 1 0 1 | 1+1i | −1−1i | −1+1i | −1+1i |
| 1 1 0 0 0 1 1 1 | 1+1i | −1−1i | −1+1i | 1+1i |
| 1 1 0 0 1 0 0 0 | 1+1i | −1−1i | 1−1i | −1−1i |
| 1 1 0 0 1 0 1 0 | 1+1i | −1−1i | 1−1i | 1−1i |
| 1 1 0 0 1 1 0 1 | 1+1i | −1−1i | 1+1i | −1+1i |
| 1 1 0 0 1 1 1 1 | 1+1i | −1−1i | 1+1i | 1+1i |
| 1 1 0 1 0 0 0 1 | 1+1i | −1+1i | −1−1i | −1+1i |
| 1 1 0 1 0 0 1 1 | 1+1i | −1+1i | −1−1i | 1+1i |
| 1 1 0 1 0 1 0 1 | 1+1i | −1+1i | −1+1i | −1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 0 1 1 0 1 0 | 1+1i | −1+1i | 1−1i | 1−1i |
| 1 1 0 1 1 1 0 0 | 1+1i | −1+1i | 1+1i | −1−1i |
| 1 1 0 1 1 1 1 0 | 1+1i | −1+1i | 1+1i | 1−1i |
| 1 1 1 0 0 0 0 0 | 1+1i | 1−1i | −1−1i | −1−1i |
| 1 1 1 0 0 0 1 0 | 1+1i | 1−1i | −1−1i | 1−1i |
| 1 1 1 0 0 1 0 0 | 1+1i | 1−1i | −1+1i | −1−1i |
| 1 1 1 0 0 1 1 0 | 1+1i | 1−1i | −1+1i | 1−1i |
| 1 1 1 0 1 0 0 1 | 1+1i | 1−1i | 1−1i | −1+1i |
| 1 1 1 0 1 0 1 1 | 1+1i | 1−1i | 1−1i | 1+1i |
| 1 1 1 0 1 1 0 1 | 1+1i | 1−1i | 1+1i | −1+1i |
| 1 1 1 0 1 1 1 1 | 1+1i | 1−1i | 1+1i | 1+1i |
| 1 1 1 1 0 0 0 1 | 1+1i | 1+1i | −1−1i | −1+1i |
| 1 1 1 1 0 0 1 1 | 1+1i | 1+1i | −1−1i | 1+1i |
| 1 1 1 1 0 1 0 0 | 1+1i | 1+1i | −1+1i | −1−1i |
| 1 1 1 1 0 1 1 0 | 1+1i | 1+1i | −1+1i | 1−1i |
| 1 1 1 1 1 0 0 1 | 1+1i | 1+1i | 1−1i | −1+1i |
| 1 1 1 1 1 0 1 1 | 1+1i | 1+1i | 1−1i | 1+1i |
| 1 1 1 1 1 1 0 0 | 1+1i | 1+1i | 1+1i | −1−1i |
| 1 1 1 1 1 1 1 0 | 1+1i | 1+1i | 1+1i | 1−1i |

These symbols have 4 possible states of polarization with the condition that the state of polarization on $T_2$ is either opposite to or different from the state of polarization on $T_1$. The constellation has a high symmetry. The structure is such that the each constellation point has the same number of neighbors. The neighbors are located at 8 different Euclidean distances, as shown on the following table.

| Euclidean Distance | Number of neighboring symbols |
|---|---|
| 2 | 4 |
| 2.82 | 12 |
| 3.46 | 28 |
| 4 | 38 |
| 4.47 | 28 |
| 4.89 | 12 |
| 5.29 | 4 |
| 5.65 | 1 |

Basically, every point of the constellation has 8 symbols at Euclidean distance of 2, 12 symbols at an Euclidean distance of 2.82, and so on. As for the modulation format of the previous embodiment, this structure is highly symmetrical, which yields good linear channel performance.

In the third exemplary embodiment, the modulation format is defined in 8D: I, Q, polarization and two consecutive time slots. To map bits into symbols 201-204, the following approach is used: from 4 information bits of the data signal 101, referred to as $[b_1, b_2, b_3, b_4]$, four overhead bits $[b'_1, b'_2, b'_3, b'_4]$ are obtained using the following equation:

$b1' = b1 \text{ XOR } b2 \text{ XOR } b3$ $b2' = b1 \text{ XOR } b2 \text{ XOR } b5$ $b3' = b1 \text{ XOR } b3 \text{ XOR } \overline{b5}$ $b4' = b2 \text{ XOR } b3 \text{ XOR } \overline{b5}$ Thus, the set of $[b_1, b_2, b_3, b'_1, b_4, b'_2, b'_3, b'_4]$ is obtained. The mapping is then done as follows. The first two bits $[b_1 b_2]$ are used to select a symbol 201-204 from the set 200 (QPSK constellation) shown in FIG. 2. These symbols represents the 2 dimensions I and Q of the X polarization on the time slot $T_1$. Using the same approach, I and Q symbols of Y polarization on $T_1$, X polarization on $T_2$ and finally Y polarization on $T_2$ are obtained using the bits $[b_3 b'_1]$, $[b_4 b'_2]$ and finally $[b'_3 b'_4]$, respectively. At the end, a spectral efficiency of 2 bits/transmission time slot (4 bits in 8 dimensions) is reached, and all obtained symbols 201-204 are given in the following table. The labelling (mapping from bits to symbols 201-204) of each symbol 201-204 is given in the table as well, because as mentioned before, different labelling may result on different linear channel performance (except for equivalent constellations related by symmetry).

tive time slots. To map bits into symbols 201-204, the following approach is used: from 6 information bits of the data signal 101, referred to as $[b_1, b_2, b_3, b_4, b_5, b_6]$, two overhead bits $[b'_1, b'_2]$ are obtained using the following equation:

$b1' = \overline{b2} \text{ XOR } b3 \text{ XOR } b5 \text{ XOR}(b1 \text{ XOR } b2)\text{AND}(b3 \text{ XOR } b4 \text{ XOR } b5 \text{ XOR } b6)\text{XOR}(b3 \text{ XOR } b4)\text{AND}(b5 \text{ XOR } b6)$ $b2' = \overline{b1} \text{ XOR } b4 \text{ XOR } b6 \text{ XOR}(b1 \text{ XOR } b2)\text{AND}(b3 \text{ XOR } b4 \text{ XOR } b5 \text{ XOR } b6)\text{XOR}(b3 \text{ XOR } b4)\text{AND}(b5 \text{ XOR } b6)$ Thus, the set of $[b_1, b_2, b_3, b_4, b_5, b_6, b'_1, b'_2]$ is obtained. The mapping is then done as follows. The first two bits $[b_1 b_2]$ are used to select a symbol 201-204 from the set 200 (QPSK constellation) shown in FIG. 2. These symbols represents the 2 dimensions I and Q of the X polarization on the time slot $T_1$. Using the same approach, I and Q symbols of Y polarization on $T_1$, X polarization on $T_2$ and finally Y polarization on $T_2$ are obtained using the bits $[b_3 b_4]$, $[b_5 b_6]$ and finally $[b'_1 b'_2]$, respectively. At the end, a spectral efficiency of 3 bits/transmission time slot (6 bits in 8 dimensions) is reached, and all obtained symbols 201-204

| Labelling (from the left to the right: 3 information bits, 1 parity bit, 1 information bit, 3 parity bits) | Time slot $T_1$ | | Time slot $T_2$ | |
|---|---|---|---|---|
| | X polarization | Y polarization | X polarization | Y polarization |
| 00000011 | −1−1i | −1−1i | −1−1i | +1+1i |
| 00001100 | −1−1i | −1−1i | +1+1i | −1−1i |
| 00110000 | −1−1i | +1+1i | −1−1i | −1−1i |
| 00111111 | −1−1i | +1+1i | +1+1i | +1+1i |
| 01010110 | −1+1i | −1−1i | −1−1i | +1−1i |
| 01011001 | −1+1i | −1−1i | +1−1i | −1+1i |
| 01100101 | −1+1i | +1−1i | −1−1i | −1+1i |
| 01101010 | −1+1i | +1−1i | +1−1i | +1−1i |
| 10010101 | +1−1i | −1+1i | −1+1i | −1+1i |
| 10011010 | +1−1i | −1+1i | +1−1i | +1−1i |
| 10100110 | +1−1i | +1−1i | −1+1i | +1−1i |
| 10101001 | +1−1i | +1−1i | +1−1i | −1+1i |
| 11000000 | +1+1i | −1−1i | −1−1i | −1−1i |
| 11001111 | +1+1i | −1−1i | +1+1i | +1+1i |
| 11110011 | +1+1i | +1+1i | −1−1i | +1+1i |
| 11111100 | +1+1i | +1+1i | +1+1i | −1−1i |

These symbols have 4 possible states of polarization with the condition that the state of polarization on $T_2$ is opposite to the state of polarization on $T_1$. The constellation has a high symmetry. The structure is such that the each constellation point has the same number of neighbors. The neighbors are located at 2 different Euclidean distances, as shown on the following table.

| Euclidean Distance | Number of neighboring symbols |
|---|---|
| 4 | 14 |
| 5.65 | 1 |

Basically, every point of the constellation has 14 symbols at Euclidean distance of 4 and one symbol at an Euclidean distance of 5.65. As for the modulation format of the previous embodiment, this structure is highly symmetrical, which yields good linear channel performance.

In the fourth exemplary embodiment, the modulation format is defined in 8D: I, Q, polarization and two consecuare given in the following table. The labelling (mapping from bits to symbols 201-204) of each symbol 201-204 is given in the table as well, because as mentioned before, different labelling may result on different linear channel performance (except for equivalent constellations related by symmetry).

| Labelling (from the left to the right: 6 information bits and 2 parity bit) | Time slot $T_1$ | | Time slot $T_2$ | |
|---|---|---|---|---|
| | X polarization | Y polarization | X polarization | Y polarization |
| 00000011 | −1−1i | −1−1i | −1−1i | +1+1i |
| 00000110 | −1−1i | −1−1i | −1+1i | +1−1i |
| 00001001 | −1−1i | −1−1i | +1−1i | −1+1i |
| 00001100 | −1−1i | −1−1i | +1+1i | −1−1i |
| 00010010 | −1−1i | −1+1i | −1−1i | +1−1i |
| 00010100 | −1−1i | −1+1i | −1+1i | −1−1i |
| 00011011 | −1−1i | −1+1i | +1−1i | +1+1i |
| 00011101 | −1−1i | −1+1i | +1+1i | −1+1i |
| 00100001 | −1−1i | +1−1i | −1−1i | −1+1i |
| 00100111 | −1−1i | +1−1i | −1+1i | +1+1i |

-continued

| Labelling (from the left to the right: 6 information bits and 2 parity bit) | Time slot $T_1$ | | Time slot $T_2$ | |
|---|---|---|---|---|
| | X polarization | Y polarization | X polarization | Y polarization |
| 00101000 | −1−1i | +1−1i | +1−1i | −1−1i |
| 00101110 | −1−1i | +1−1i | +1+1i | +1−1i |
| 00110000 | −1−1i | +1+1i | −1−1i | −1−1i |
| 00110101 | −1−1i | +1+1i | −1+1i | −1+1i |
| 00111010 | −1−1i | +1+1i | +1−1i | +1−1i |
| 00111111 | −1−1i | +1+1i | +1+1i | +1+1i |
| 01000001 | −1+1i | −1−1i | −1−1i | −1+1i |
| 01000111 | −1+1i | −1−1i | −1+1i | +1+1i |
| 01001000 | −1+1i | −1−1i | +1−1i | −1−1i |
| 01001110 | −1+1i | −1−1i | +1+1i | +1−1i |
| 01010011 | −1+1i | −1+1i | −1−1i | +1+1i |
| 01010110 | −1+1i | −1+1i | −1+1i | +1−1i |
| 01011001 | −1+1i | −1+1i | +1−1i | −1+1i |
| 01011100 | −1+1i | −1+1i | +1+1i | −1−1i |
| 01100000 | −1+1i | +1−1i | −1−1i | −1−1i |
| 01100101 | −1+1i | +1−1i | −1+1i | −1+1i |
| 01101010 | −1+1i | +1−1i | +1−1i | +1−1i |
| 01101111 | −1+1i | +1−1i | +1+1i | +1+1i |
| 01110010 | −1+1i | +1+1i | −1−1i | +1−1i |
| 01110100 | −1+1i | +1+1i | −1+1i | −1−1i |
| 01111011 | −1+1i | +1+1i | +1−1i | +1+1i |
| 01111101 | −1+1i | +1+1i | +1+1i | −1+1i |
| 10000010 | +1−1i | −1−1i | −1−1i | +1−1i |
| 10000100 | +1−1i | −1−1i | −1+1i | −1−1i |
| 10001011 | +1−1i | −1−1i | +1−1i | +1+1i |
| 10001101 | +1−1i | −1−1i | +1+1i | −1+1i |
| 10010000 | +1−1i | −1+1i | −1−1i | −1−1i |
| 10010101 | +1−1i | −1+1i | −1+1i | −1+1i |
| 10011010 | +1−1i | −1+1i | +1−1i | +1−1i |
| 10011111 | +1−1i | −1+1i | +1+1i | +1+1i |
| 10100011 | +1−1i | +1−1i | −1−1i | +1+1i |
| 10100110 | +1−1i | +1−1i | −1+1i | +1−1i |
| 10101001 | +1−1i | +1−1i | +1−1i | −1+1i |
| 10101100 | +1−1i | +1−1i | +1+1i | −1−1i |
| 10110001 | +1−1i | +1+1i | −1−1i | −1+1i |
| 10110111 | +1−1i | +1+1i | −1+1i | +1+1i |
| 10111000 | +1−1i | +1+1i | +1−1i | −1−1i |
| 10111110 | +1−1i | +1+1i | +1+1i | +1−1i |
| 11000000 | +1+1i | −1−1i | −1−1i | −1−1i |
| 11000101 | +1+1i | −1−1i | −1+1i | −1+1i |
| 11001010 | +1+1i | −1−1i | +1−1i | +1−1i |
| 11001111 | +1+1i | −1−1i | +1+1i | +1+1i |
| 11010001 | +1+1i | −1+1i | −1−1i | −1+1i |
| 11010111 | +1+1i | −1+1i | −1+1i | +1+1i |
| 11011000 | +1+1i | −1+1i | +1−1i | −1−1i |
| 11011110 | +1+1i | −1+1i | +1+1i | +1−1i |
| 11100010 | +1+1i | +1−1i | −1−1i | +1−1i |
| 11100100 | +1+1i | +1−1i | −1+1i | −1−1i |
| 11101011 | +1+1i | +1−1i | +1−1i | +1+1i |
| 11101101 | +1+1i | +1−1i | +1+1i | −1+1i |
| 11110011 | +1+1i | +1+1i | −1−1i | +1+1i |
| 11110110 | +1+1i | +1+1i | −1+1i | +1−1i |
| 11111001 | +1+1i | +1+1i | +1−1i | −1+1i |
| 11111100 | +1+1i | +1+1i | +1+1i | −1−1i |

These symbols have 4 possible states of polarization with the condition that the state of polarization on $T_2$ is opposite to the state of polarization on $T_1$. The constellation has a high symmetry. The structure is such that the each constellation point has the same number of neighbors. The neighbors are located at 4 different Euclidean distances, as shown on the following table.

| Euclidean Distance | Number of neighboring symbols |
|---|---|
| 2.82 | 12 |
| 4 | 38 |
| 4.89 | 12 |
| 5.65 | 1 |

Basically, every point of the constellation has 12 symbols at Euclidean distance of 2.82, 38 symbols at an Euclidean distance of 4, and so on. As for the modulation format of the previous embodiment, this structure is highly symmetrical, which yields good linear channel performance.

The four exemplary modulation formats presented above, provide the optical transmitter 100 with a linear and non-linear channel performance that exceeds the state of the art. In particular, the exemplary modulation format with a spectral efficiency of 2.5 bit/transmission time slot has a better nonlinear performance (found to be 0.35 dB higher in Q2 factor) than the one of a corresponding conventional solution, even though the linear performance is the same. The modulation format with spectral efficiency of 3.5 bit/transmission time slot has better linear and nonlinear performance. This is because the set 200 of symbols 201-0204 (base constellation) has a higher Euclidian distance, which gives better linear performance. As mentioned above, this can be achieved because the polarization-balance criterion is relaxed to polarization alternating. This allows using the base constellation as for example shown in FIG. 2. Modulation formats of spectral efficiencies of 2 and 3 bit/transmission time slot have the same performance of the state-of-the-art but are generated using Boolean equations, which simplify the mapper and demapper and allow low complexity implementation, which results on low power consuming solution.

Figure 5:
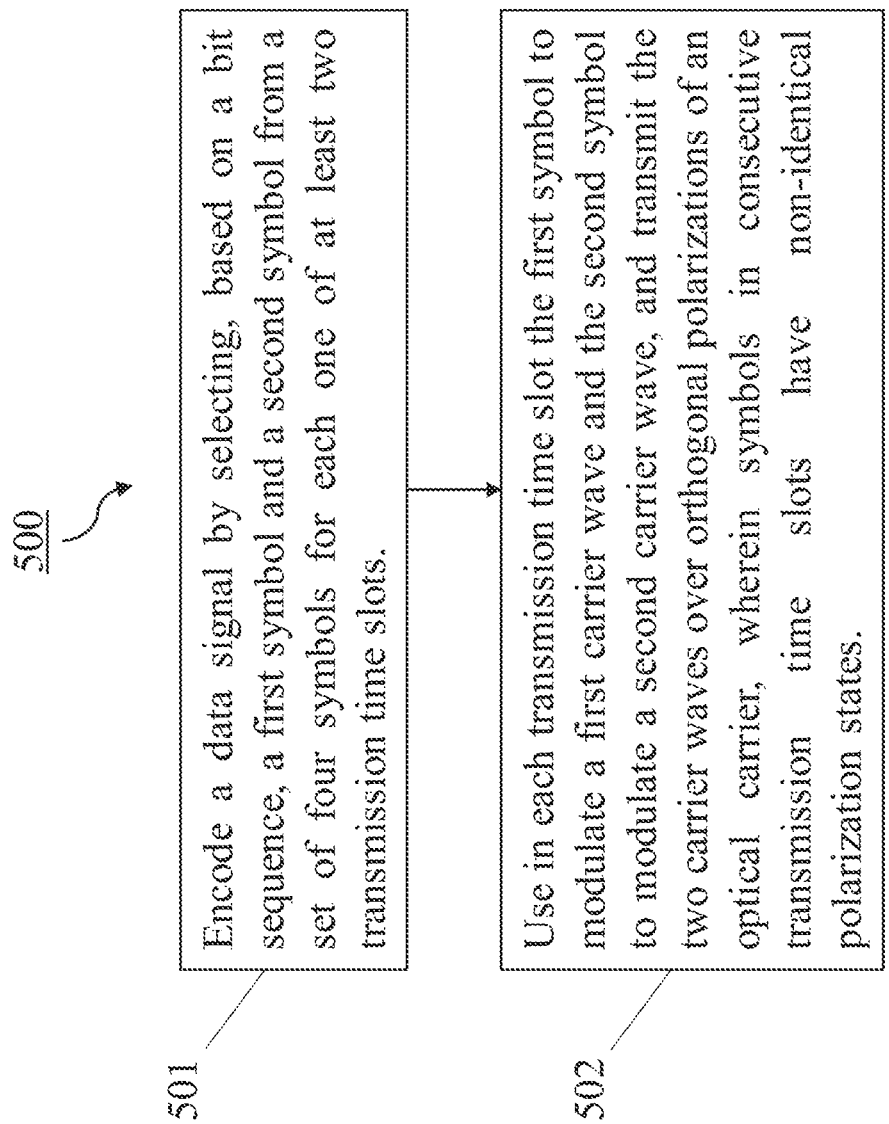
FIG. 5 shows a method according to an exemplary embodiment of the present disclosure.

FIG. 5 shows a method 500 of optically transmitting a data signal 101. The method 500 may be performed by the optical transmitter 100. The method comprises a step 501 of encoding 501 the data signal 101 by selecting based on a bit sequence a first symbol and a second symbol from a set 200 of four symbols 201-204 for each one of at least two transmission time slots. This step 501 may be performed by the encoder 102. The method 500 further comprises a step 502 of using in each transmission time slot the first symbol to modulate a first carrier wave and the second symbol to modulate a second carrier wave, and transmitting the two carrier waves over orthogonal polarizations of an optical carrier 104. This step 501 may be performed by the modulator 103. Symbols 201-204 in consecutive transmission time slots have non-identical polarization states.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An optical transmitter for transmitting a data signal, the optical transmitter comprising:
    an encoder configured to map a number of information bits of the data signal to a symbol in an eight-dimensional constellation space spanned by vectors IXT1, QXT1, IYT1, QYT1, IXT2, QXT2, IYT2, QYT2, wherein I and Q are in-phase and quadrature components of an optical carrier, X and Y are orthogonal polarizations of the optical carrier, and T1 and T2 are two consecutive transmission time slots, by selecting the symbol from a set of constellation points in the eight-dimensional constellation space; and a modulator configured to use the selected symbol in the two consecutive transmission time slots T1 and T2 to modulate a first carrier wave and a second carrier wave, and to transmit the first carrier wave and the second carrier wave over the orthogonal polarizations X and Y of the optical carrier;

wherein the set of constellation points does not comprise any constellation point with parallel Stokes vectors in the two consecutive transmission time slots T1 and T2 and comprises one or more constellation points with orthogonal Stokes vectors in the two consecutive transmission time slots T1 and T2.

2. The optical transmitter according to claim 1, wherein each constellation point in the set of constellation points comprises, for each of the two consecutive transmission time slots T1 and T2, a first symbol for modulating the first carrier wave and a second symbol for modulating the second carrier wave.

3. The optical transmitter according to claim 2, wherein the first symbol for modulating the first carrier wave and the second symbol for modulating the second carrier wave are from a quadrature phase shift keying (QPSK) base constellation.

4. The optical transmitter according to claim 1, wherein the modulator is configured to modulate an in-phase component and a quadrature component of each of the first carrier wave and the second carrier wave.

5. The optical transmitter according to claim 1, wherein the set of constellation points further comprises one or more constellation points with anti-parallel Stokes vectors in the two consecutive transmission time slots T1 and T2.

6. The optical transmitter according to claim 1, wherein the encoder is configured to map the information bits to the symbol in the eight-dimensional constellation space by:
generating a number of overhead bits from the information bits; and
mapping a bit sequence that comprises the information bits and the overhead bits to the symbol in the eight-dimensional constellation space.

7. The optical transmitter according to claim 6, wherein the encoder is configured to generate the overhead bits from the information bits by using Boolean equations.

8. The optical transmitter according to claim 7, wherein the encoder is configured to perform at least one Boolean operation based on at least two of the information bits to obtain at least one of the overhead bits of the bit sequence.

9. The optical transmitter according to claim 6, wherein the optical transmitter is configured to transmit the data signal with a spectral efficiency of 2.5 bits per transmission time slot.

10. The optical transmitter according to claim 9, wherein symbol polarization states in each of the transmission time slots take one of at least four distinct polarizations states.

11. The optical transmitter according to claim 9,
wherein the information bits are five bits b1 ... b5,
wherein the overhead bits are three overhead bits b1', b2', b3'
wherein the bit sequence comprises the eight bits b1 ... b5, b1', b2', b3', and
wherein the three overhead bits b1', b2', b3' are generated according to:

$b1' = b3$ XOR $b4$ XOR $b5$ $b2' = \overline{b2}$ XOR $b4$ XOR $b5$ $b3' = \overline{b1}$ XOR $b4$ XOR $b5$.

12. The optical transmitter according to claim 11, wherein for the two consecutive transmission time slots T1 and T2, for the orthogonal polarizations X and Y of the optical carrier, and for a set of four QPSK symbols denoted −1−1i, −1+1i, 1−1i and 1+1i, the encoder is configured to select the symbol in the eight-dimensional constellation space based on the information bits according to the following labelling:

| Labelling (from left to right) 5 bits b1 ... b5, and 3 overhead bits b1', b2', b3' | Time slot $T_1$ X polarization | Time slot $T_1$ Y polarization | Time slot $T_2$ X polarization | Time slot $T_2$ Y polarization |
|---|---|---|---|---|
| 0 0 0 0 0 0 1 1 | −1−1i | −1−1i | −1−1i | 1+1i |
| 0 0 0 0 1 1 0 0 | −1−1i | −1−1i | 1+1i | −1−1i |
| 0 0 0 1 0 1 0 0 | −1−1i | −1+1i | −1+1i | −1−1i |
| 0 0 0 1 1 0 1 1 | −1−1i | −1+1i | 1−1i | 1+1i |
| 0 0 1 0 0 1 1 1 | −1−1i | 1−1i | −1+1i | 1+1i |
| 0 0 1 0 1 0 0 0 | −1−1i | 1−1i | 1−1i | −1−1i |
| 0 0 1 1 0 0 0 0 | −1−1i | 1+1i | −1−1i | −1−1i |
| 0 0 1 1 1 1 1 1 | −1−1i | 1+1i | 1+1i | 1+1i |
| 0 1 0 0 0 0 0 1 | −1+1i | −1−1i | −1−1i | −1+1i |
| 0 1 0 0 1 1 1 0 | −1+1i | −1−1i | 1+1i | 1−1i |
| 0 1 0 1 0 1 1 0 | −1+1i | −1+1i | −1+1i | 1−1i |
| 0 1 0 1 1 0 0 1 | −1+1i | −1+1i | 1−1i | −1+1i |
| 0 1 1 0 0 1 0 1 | −1+1i | 1−1i | −1+1i | −1+1i |
| 0 1 1 0 1 0 1 0 | −1+1i | 1−1i | 1−1i | 1−1i |
| 0 1 1 1 0 0 1 0 | −1+1i | 1+1i | −1−1i | 1−1i |
| 0 1 1 1 1 1 0 1 | −1+1i | 1+1i | 1+1i | −1+1i |
| 1 0 0 0 0 0 1 0 | 1−1i | −1−1i | −1−1i | 1−1i |
| 1 0 0 0 1 1 0 1 | 1−1i | −1−1i | 1+1i | −1+1i |
| 1 0 0 1 0 1 0 1 | 1−1i | −1+1i | −1+1i | −1+1i |
| 1 0 0 1 1 0 1 0 | 1−1i | −1+1i | 1−1i | 1−1i |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 1 0 0 0 1 | 1−1i | 1+1i | −1−1i | −1+1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 1 1 1 1 | 1+1i | −1−1i | 1+1i | 1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 1 0 0 1 0 0 | 1+1i | 1−1i | −1+1i | −1−1i |
| 1 1 1 0 1 0 1 1 | 1+1i | 1−1i | 1−1i | 1+1i |
| 1 1 1 1 0 0 1 1 | 1+1i | 1+1i | −1−1i | 1+1i |
| 1 1 1 1 1 1 0 0 | 1+1i | 1+1i | 1+1i | −1−1i. |

13. The optical transmitter according to claim 6, wherein the optical transmitter is configured to transmit the data signal with a spectral efficiency of 3.5 bits per transmission time slot.

14. The optical transmitter according to claim 13, wherein symbols in at least a subset of the consecutive transmission time slots have orthogonal polarization states.

15. The optical transmitter according to claim 13,
wherein the information bits are seven bits b1 ... b7,
wherein the overhead bit is bit b',
wherein the bit sequence comprises eight the bits b1 ... b7, b', and
wherein the overhead bit b' is generated according to:

$b1' = \overline{b1}$ XOR $b4$ XOR $b6$ XOR ($b1$ XOR $b2$)AND($b3$ XOR $b4$ XOR $b5$ XOR $b6$)XOR ($b3$ XOR $b4$)AND($b5$ XOR $b6$).

16. The optical transmitter according to claim 15, wherein for the two consecutive transmission time slots T1 and T2, for the orthogonal polarizations X and Y of the optical carrier, and for a set of four QPSK symbols denoted −1−1i, −1+1i, 1−1i and 1+1i, the encoder is configured to select the symbol in the eight-dimensional constellation space based on the information bits according to the following labelling:

| Labelling (from left to right) 7 bits b1 ... b7, and 1 overhead bit b' | Time slot $T_1$ | | Time slot $T_2$ | |
|---|---|---|---|---|
| | X polarization | Y polarization | X polarization | Y polarization |
| 0 0 0 0 0 0 0 1 | −1−1i | −1−1i | −1−1i | −1+1i |
| 0 0 0 0 0 0 1 1 | −1−1i | −1−1i | −1−1i | 1+1i |
| 0 0 0 0 0 1 0 0 | −1−1i | −1−1i | −1+1i | −1−1i |
| 0 0 0 0 0 1 1 0 | −1−1i | −1−1i | −1+1i | 1−1i |
| 0 0 0 0 1 0 0 1 | −1−1i | −1−1i | 1−1i | −1+1i |
| 0 0 0 0 1 0 1 1 | −1−1i | −1−1i | 1−1i | 1+1i |
| 0 0 0 0 1 1 0 0 | −1−1i | −1−1i | 1+1i | −1−1i |
| 0 0 0 0 1 1 1 0 | −1−1i | −1−1i | 1+1i | 1−1i |
| 0 0 0 1 0 0 0 0 | −1−1i | −1+1i | −1−1i | −1−1i |
| 0 0 0 1 0 0 1 0 | −1−1i | −1+1i | −1−1i | 1−1i |
| 0 0 0 1 0 1 0 0 | −1−1i | −1+1i | −1+1i | −1−1i |
| 0 0 0 1 0 1 1 0 | −1−1i | −1+1i | −1+1i | 1−1i |
| 0 0 0 1 1 0 0 1 | −1−1i | −1+1i | 1−1i | −1+1i |
| 0 0 0 1 1 0 1 1 | −1−1i | −1+1i | 1−1i | 1+1i |
| 0 0 0 1 1 1 0 1 | −1−1i | −1+1i | 1+1i | −1+1i |
| 0 0 0 1 1 1 1 1 | −1−1i | −1+1i | 1+1i | 1+1i |
| 0 0 1 0 0 0 0 1 | −1−1i | 1−1i | −1−1i | −1+1i |
| 0 0 1 0 0 0 1 1 | −1−1i | 1−1i | −1−1i | 1+1i |
| 0 0 1 0 0 1 0 1 | −1−1i | 1−1i | −1+1i | −1+1i |
| 0 0 1 0 0 1 1 1 | −1−1i | 1−1i | −1+1i | 1+1i |
| 0 0 1 0 1 0 0 0 | −1−1i | 1−1i | 1−1i | −1−1i |
| 0 0 1 0 1 0 1 0 | −1−1i | 1−1i | 1−1i | 1−1i |
| 0 0 1 0 1 1 0 0 | −1−1i | 1−1i | 1+1i | −1−1i |
| 0 0 1 0 1 1 1 0 | −1−1i | 1−1i | 1+1i | 1−1i |
| 0 0 1 1 0 0 0 0 | −1−1i | 1+1i | −1−1i | −1−1i |
| 0 0 1 1 0 0 1 0 | −1−1i | 1+1i | −1−1i | 1−1i |
| 0 0 1 1 0 1 0 1 | −1−1i | 1+1i | −1+1i | −1+1i |
| 0 0 1 1 0 1 1 1 | −1−1i | 1+1i | −1+1i | 1+1i |
| 0 0 1 1 1 0 0 0 | −1−1i | 1+1i | 1−1i | −1−1i |
| 0 0 1 1 1 0 1 0 | −1−1i | 1+1i | 1−1i | 1−1i |
| 0 0 1 1 1 1 0 1 | −1−1i | 1+1i | 1+1i | −1+1i |
| 0 0 1 1 1 1 1 1 | −1−1i | 1+1i | 1+1i | 1+1i |
| 0 1 0 0 0 0 0 1 | −1+1i | −1−1i | −1−1i | −1+1i |
| 0 1 0 0 0 0 1 1 | −1+1i | −1−1i | −1−1i | 1+1i |
| 0 1 0 0 0 1 0 1 | −1+1i | −1−1i | −1+1i | −1+1i |
| 0 1 0 0 0 1 1 1 | −1+1i | −1−1i | −1+1i | 1+1i |
| 0 1 0 0 1 0 0 0 | −1+1i | −1−1i | 1−1i | −1−1i |
| 0 1 0 0 1 0 1 0 | −1+1i | −1−1i | 1−1i | 1−1i |
| 0 1 0 0 1 1 0 0 | −1+1i | −1−1i | 1+1i | −1−1i |
| 0 1 0 0 1 1 1 0 | −1+1i | −1−1i | 1+1i | 1−1i |
| 0 1 0 1 0 0 0 1 | −1+1i | −1+1i | −1−1i | −1+1i |
| 0 1 0 1 0 0 1 1 | −1+1i | −1+1i | −1−1i | 1+1i |
| 0 1 0 1 0 1 0 0 | −1+1i | −1+1i | −1+1i | −1−1i |
| 0 1 0 1 0 1 1 0 | −1+1i | −1+1i | −1+1i | 1−1i |
| 0 1 0 1 1 0 0 1 | −1+1i | −1+1i | 1−1i | −1+1i |
| 0 1 0 1 1 0 1 1 | −1+1i | −1+1i | 1−1i | 1+1i |
| 0 1 0 1 1 1 0 1 | −1+1i | −1+1i | 1+1i | −1+1i |
| 0 1 0 1 1 1 1 0 | −1+1i | −1+1i | 1+1i | 1−1i |
| 0 1 1 0 0 0 0 0 | −1+1i | 1−1i | −1−1i | −1−1i |
| 0 1 1 0 0 0 1 0 | −1+1i | 1−1i | −1−1i | 1−1i |
| 0 1 1 0 0 1 0 1 | −1+1i | 1−1i | −1+1i | −1+1i |
| 0 1 1 0 0 1 1 1 | −1+1i | 1−1i | −1+1i | 1+1i |
| 0 1 1 0 1 0 0 0 | −1+1i | 1−1i | 1−1i | −1−1i |
| 0 1 1 0 1 0 1 0 | −1+1i | 1−1i | 1−1i | 1−1i |
| 0 1 1 0 1 1 0 1 | −1+1i | 1−1i | 1+1i | −1+1i |
| 0 1 1 0 1 1 1 1 | −1+1i | 1−1i | 1+1i | 1+1i |
| 0 1 1 1 0 0 0 0 | −1+1i | 1+1i | −1−1i | −1−1i |
| 0 1 1 1 0 0 1 0 | −1+1i | 1+1i | −1−1i | 1−1i |
| 0 1 1 1 0 1 0 0 | −1+1i | 1+1i | −1+1i | −1−1i |
| 0 1 1 1 0 1 1 0 | −1+1i | 1+1i | −1+1i | 1−1i |
| 0 1 1 1 1 0 0 1 | −1+1i | 1+1i | 1−1i | −1+1i |
| 0 1 1 1 1 0 1 1 | −1+1i | 1+1i | 1−1i | 1+1i |
| 0 1 1 1 1 1 0 1 | −1+1i | 1+1i | 1+1i | −1+1i |
| 0 1 1 1 1 1 1 1 | −1+1i | 1+1i | 1+1i | 1+1i |
| 1 0 0 0 0 0 0 0 | 1−1i | −1−1i | −1−1i | −1−1i |
| 1 0 0 0 0 0 1 0 | 1−1i | −1−1i | −1−1i | 1−1i |
| 1 0 0 0 0 1 0 0 | 1−1i | −1−1i | −1+1i | −1−1i |
| 1 0 0 0 0 1 1 0 | 1−1i | −1−1i | −1+1i | 1−1i |
| 1 0 0 0 1 0 0 1 | 1−1i | −1−1i | 1−1i | −1+1i |
| 1 0 0 0 1 0 1 1 | 1−1i | −1−1i | 1−1i | 1+1i |
| 1 0 0 0 1 1 0 1 | 1−1i | −1−1i | 1+1i | −1+1i |
| 1 0 0 0 1 1 1 1 | 1−1i | −1−1i | 1+1i | 1+1i |
| 1 0 0 1 0 0 0 0 | 1−1i | −1+1i | −1−1i | −1−1i |
| 1 0 0 1 0 0 1 0 | 1−1i | −1+1i | −1−1i | 1−1i |
| 1 0 0 1 0 1 0 1 | 1−1i | −1+1i | −1+1i | −1+1i |
| 1 0 0 1 0 1 1 1 | 1−1i | −1+1i | −1+1i | 1+1i |
| 1 0 0 1 1 0 0 0 | 1−1i | −1+1i | 1−1i | −1−1i |
| 1 0 0 1 1 0 1 0 | 1−1i | −1+1i | 1−1i | 1−1i |
| 1 0 0 1 1 1 0 1 | 1−1i | −1+1i | 1+1i | −1+1i |
| 1 0 0 1 1 1 1 1 | 1−1i | −1+1i | 1+1i | 1+1i |
| 1 0 1 0 0 0 0 1 | 1−1i | 1−1i | −1−1i | −1+1i |
| 1 0 1 0 0 0 1 1 | 1−1i | 1−1i | −1−1i | 1+1i |
| 1 0 1 0 0 1 0 0 | 1−1i | 1−1i | −1+1i | −1−1i |
| 1 0 1 0 0 1 1 0 | 1−1i | 1−1i | −1+1i | 1−1i |
| 1 0 1 0 1 0 0 1 | 1−1i | 1−1i | 1−1i | −1+1i |
| 1 0 1 0 1 0 1 1 | 1−1i | 1−1i | 1−1i | 1+1i |
| 1 0 1 0 1 1 0 0 | 1−1i | 1−1i | 1+1i | −1−1i |
| 1 0 1 0 1 1 1 0 | 1−1i | 1−1i | 1+1i | 1−1i |
| 1 0 1 1 0 0 0 1 | 1−1i | 1+1i | −1−1i | −1+1i |
| 1 0 1 1 0 0 1 1 | 1−1i | 1+1i | −1−1i | 1+1i |
| 1 0 1 1 0 1 0 1 | 1−1i | 1+1i | −1+1i | −1+1i |
| 1 0 1 1 0 1 1 1 | 1−1i | 1+1i | −1+1i | 1+1i |
| 1 0 1 1 1 0 0 0 | 1−1i | 1+1i | 1−1i | −1−1i |
| 1 0 1 1 1 0 1 0 | 1−1i | 1+1i | 1−1i | 1−1i |
| 1 0 1 1 1 1 0 0 | 1−1i | 1+1i | 1+1i | −1−1i |
| 1 0 1 1 1 1 1 0 | 1−1i | 1+1i | 1+1i | 1−1i |
| 1 1 0 0 0 0 0 0 | 1+1i | −1−1i | −1−1i | −1−1i |
| 1 1 0 0 0 0 1 0 | 1+1i | −1−1i | −1−1i | 1−1i |
| 1 1 0 0 0 1 0 1 | 1+1i | −1−1i | −1+1i | −1+1i |
| 1 1 0 0 0 1 1 1 | 1+1i | −1−1i | −1+1i | 1+1i |
| 1 1 0 0 1 0 0 0 | 1+1i | −1−1i | 1−1i | −1−1i |
| 1 1 0 0 1 0 1 0 | 1+1i | −1−1i | 1−1i | 1−1i |
| 1 1 0 0 1 1 0 1 | 1+1i | −1−1i | 1+1i | −1+1i |
| 1 1 0 0 1 1 1 1 | 1+1i | −1−1i | 1+1i | 1+1i |
| 1 1 0 1 0 0 0 1 | 1+1i | −1+1i | −1−1i | −1+1i |
| 1 1 0 1 0 0 1 1 | 1+1i | −1+1i | −1−1i | 1+1i |
| 1 1 0 1 0 1 0 1 | 1+1i | −1+1i | −1+1i | −1+1i |
| 1 1 0 1 0 1 1 1 | 1+1i | −1+1i | −1+1i | 1+1i |
| 1 1 0 1 1 0 0 0 | 1+1i | −1+1i | 1−1i | −1−1i |
| 1 1 0 1 1 0 1 0 | 1+1i | −1+1i | 1−1i | 1−1i |
| 1 1 0 1 1 1 0 0 | 1+1i | −1+1i | 1+1i | −1−1i |
| 1 1 0 1 1 1 1 0 | 1+1i | −1+1i | 1+1i | 1−1i |
| 1 1 1 0 0 0 0 0 | 1+1i | 1−1i | −1−1i | −1−1i |
| 1 1 1 0 0 0 1 0 | 1+1i | 1−1i | −1−1i | 1−1i |
| 1 1 1 0 0 1 0 0 | 1+1i | 1−1i | −1+1i | −1−1i |
| 1 1 1 0 0 1 1 0 | 1+1i | 1−1i | −1+1i | 1−1i |
| 1 1 1 0 1 0 0 1 | 1+1i | 1−1i | 1−1i | −1+1i |
| 1 1 1 0 1 0 1 1 | 1+1i | 1−1i | 1−1i | 1+1i |
| 1 1 1 0 1 1 0 1 | 1+1i | 1−1i | 1+1i | −1+1i |
| 1 1 1 0 1 1 1 1 | 1+1i | 1−1i | 1+1i | 1+1i |
| 1 1 1 1 0 0 0 1 | 1+1i | 1+1i | −1−1i | −1+1i |
| 1 1 1 1 0 0 1 1 | 1+1i | 1+1i | −1−1i | 1+1i |
| 1 1 1 1 0 1 0 0 | 1+1i | 1+1i | −1+1i | −1−1i |
| 1 1 1 1 0 1 1 0 | 1+1i | 1+1i | −1+1i | 1−1i |
| 1 1 1 1 1 0 0 1 | 1+1i | 1+1i | 1−1i | −1+1i |
| 1 1 1 1 1 0 1 1 | 1+1i | 1+1i | 1−1i | 1+1i |
| 1 1 1 1 1 1 0 0 | 1+1i | 1+1i | 1+1i | −1−1i |
| 1 1 1 1 1 1 1 0 | 1+1i | 1+1i | 1+1i | 1−1i. |

17. The optical transmitter according to claim 6, wherein the optical transmitter is configured to transmit the data signal with a spectral efficiency of 2 bits per transmission time slot.

18. The optical transmitter according to claim 17, wherein the symbol polarization states in each of the transmission time slots take one of at least four distinct polarization states.

19. The optical transmitter according to claim 17, wherein the information bits are four bits b1 ... b4, wherein the overhead bits comprise bits b1', b2', b3', b4', wherein the bit sequence comprises the eight bits b1 ... b3, b1', b4, b2' ... b4', and wherein the overhead bits b1', b2', b3', b4' are generated according to:

$b1' = b1$ XOR $b2$ XOR $b3$ $b2' = b1$ XOR $b2$ XOR $b5$ $b3' = b1$ XOR $b3$ XOR $\overline{b5}$ $b4' = b2$ XOR $b3$ XOR $\overline{b5}$.

20. The optical transmitter according to claim 19, wherein for the two of the consecutive transmission time slots T1 and T2, for the orthogonal polarizations X and Y of the optical carrier, and for a set of four QPSK symbols denoted −1−1i, −1+1i, 1−1i, 1+1i, the encoder is configured to select the symbol in the eight-dimensional constellation space based on the information bits according to the following labelling:

| Labelling (from the left to the right: 3 information bits, 1 parity bit, 1 information bit, 3 parity bits) | Time slot $T_1$ | | Time slot $T_2$ | |
|---|---|---|---|---|
| | X polarization | Y polarization | X polarization | Y polarization |
| 00000011 | −1−1i | −1−1i | −1−1i | +1+1i |
| 00001100 | −1−1i | −1−1i | +1+1i | −1−1i |
| 00110000 | −1−1i | +1+1i | −1−1i | −1−1i |
| 00111111 | −1−1i | +1+1i | +1+1i | +1+1i |
| 01010110 | −1+1i | −1+1i | −1+1i | +1−1i |
| 01011001 | −1+1i | −1+1i | +1−1i | −1+1i |
| 01100101 | −1+1i | +1−1i | −1+1i | −1+1i |
| 01101010 | −1+1i | +1−1i | +1−1i | +1−1i |
| 10010101 | +1−1i | −1+1i | −1+1i | −1+1i |
| 10011010 | +1−1i | −1+1i | +1−1i | +1−1i |
| 10100110 | +1−1i | +1−1i | −1+1i | +1−1i |
| 10101001 | +1−1i | +1−1i | +1−1i | −1+1i |
| 11000000 | +1+1i | −1−1i | −1−1i | −1−1i |
| 11001111 | +1+1i | −1−1i | +1+1i | +1+1i |
| 11110011 | +1+1i | +1+1i | −1−1i | +1+1i |
| 11111100 | +1+1i | +1+1i | +1+1i | −1−1i. |

21. The optical transmitter according to claim 6, wherein the optical transmitter is configured to transmit the data signal with a spectral efficiency of 3 bits per transmission time slot.

22. The optical transmitter according to claim 21, wherein symbols in at least a subset of the consecutive transmission time slots have orthogonal polarization states.

23. The optical transmitter according to claim 21,
wherein the information bits are six bits b1 ... b6,
wherein the overhead bits comprise bits b1', b2',
wherein the bit sequence comprises the eight bits b1 ... b6, b1', b2', and
wherein the bits b1', b2; are generated according to:

$b1' = \overline{b2}$ XOR $b3$ XOR $b5$ XOR$(b1$ XOR $b2)$AND$(b3$ XOR $b4$ XOR $b5$ XOR $b6)$XOR$(b3$ XOR $b4)$AND$(b5$ XOR $b6)$ $b2' = \overline{b1}$XOR $b4$ XOR $b6$ XOR$(b1$ XOR $b2)$AND$(b3$ XOR $b4$ XOR $b5$ XOR $b6)$XOR$(b3$ XOR $b4)$AND$(b5$ XOR $b6)$.

24. The optical transmitter according to claim 23, wherein for the two consecutive transmission time slots T1 and T2, for the orthogonal polarizations X and Y of the optical carrier, and for a set of four QPSK symbols denoted −1−1i, −1+1i, 1−1i and 1+1i, the encoder is configured to select the symbol in the eight-dimensional constellation space based on the information bits according to the following labelling:

| Labelling (from the left to the right: 6 information bits and 2 parity bit) | Time slot T1 | | Time slot T2 | |
|---|---|---|---|---|
| | X polarization | Y polarization | X polarization | Y polarization |
| 00000011 | −1−1i | −1−1i | −1−1i | +1+1i |
| 00000110 | −1−1i | −1−1i | −1+1i | +1−1i |
| 00001001 | −1−1i | −1−1i | +1−1i | −1+1i |
| 00001100 | −1−1i | −1−1i | +1+1i | −1−1i |
| 00010010 | −1−1i | −1+1i | −1−1i | +1−1i |

-continued

| Labelling (from the left to the right: 6 information bits and 2 parity bit) | Time slot T1 | | Time slot T2 | |
|---|---|---|---|---|
| | X polarization | Y polarization | X polarization | Y polarization |
| 00010100 | −1−1i | −1+1i | −1+1i | −1−1i |
| 00011011 | −1−1i | −1+1i | +1−1i | +1+1i |
| 00011101 | −1−1i | −1+1i | +1+1i | −1+1i |
| 00100001 | −1−1i | +1−1i | −1−1i | −1+1i |
| 00100111 | −1−1i | +1−1i | −1+1i | +1+1i |
| 00101000 | −1−1i | +1−1i | +1−1i | −1−1i |
| 00101110 | −1−1i | +1−1i | +1+1i | +1−1i |
| 00110000 | −1−1i | +1+1i | −1−1i | −1−1i |
| 00110101 | −1−1i | +1+1i | −1+1i | −1+1i |
| 00111010 | −1−1i | +1+1i | +1−1i | +1−1i |
| 00111111 | −1−1i | +1+1i | +1+1i | +1+1i |
| 01000001 | −1+1i | −1−1i | −1−1i | −1+1i |
| 01000111 | −1+1i | −1−1i | −1+1i | +1+1i |
| 01001000 | −1+1i | −1−1i | +1−1i | −1−1i |
| 01001110 | −1+1i | −1−1i | +1+1i | +1−1i |
| 01010011 | −1+1i | −1+1i | −1−1i | +1+1i |
| 01010110 | −1+1i | −1+1i | −1+1i | +1−1i |
| 01011001 | −1+1i | −1+1i | +1−1i | −1+1i |
| 01011100 | −1+1i | −1+1i | +1+1i | −1−1i |
| 01100000 | −1+1i | +1−1i | −1−1i | −1−1i |
| 01100101 | −1+1i | +1−1i | −1+1i | −1+1i |
| 01101010 | −1+1i | +1−1i | +1−1i | +1−1i |
| 01101111 | −1+1i | +1−1i | +1+1i | +1+1i |
| 01110010 | −1+1i | +1+1i | −1−1i | +1−1i |
| 01110100 | −1+1i | +1+1i | −1+1i | −1−1i |
| 01111011 | −1+1i | +1+1i | +1−1i | +1+1i |
| 01111101 | −1+1i | +1+1i | +1+1i | −1+1i |
| 10000010 | +1−1i | −1−1i | −1−1i | +1−1i |
| 10000100 | +1−1i | −1−1i | −1+1i | −1−1i |
| 10001011 | +1−1i | −1−1i | +1−1i | +1+1i |
| 10001101 | +1−1i | −1−1i | +1+1i | −1+1i |
| 10010000 | +1−1i | −1+1i | −1−1i | −1−1i |
| 10010101 | +1−1i | −1+1i | −1+1i | −1+1i |
| 10011010 | +1−1i | −1+1i | +1−1i | +1−1i |
| 10011111 | +1−1i | −1+1i | +1+1i | +1+1i |
| 10100011 | +1−1i | +1−1i | −1−1i | +1+1i |
| 10100110 | +1−1i | +1−1i | −1+1i | +1−1i |
| 10101001 | +1−1i | +1−1i | +1−1i | −1+1i |
| 10101100 | +1−1i | +1−1i | +1+1i | −1−1i |
| 10110001 | +1−1i | +1+1i | −1−1i | −1+1i |
| 10110111 | +1−1i | +1+1i | −1+1i | +1+1i |
| 10111000 | +1−1i | +1+1i | +1−1i | −1−1i |
| 10111110 | +1−1i | +1+1i | +1+1i | +1−1i |
| 11000000 | +1+1i | −1−1i | −1−1i | −1−1i |
| 11000101 | +1+1i | −1−1i | −1+1i | −1+1i |
| 11001010 | +1+1i | −1−1i | +1−1i | +1−1i |
| 11001111 | +1+1i | −1−1i | +1+1i | +1+1i |
| 11010001 | +1+1i | −1+1i | −1−1i | −1+1i |
| 11010111 | +1+1i | −1+1i | −1+1i | +1+1i |
| 11011000 | +1+1i | −1+1i | +1−1i | −1−1i |
| 11011110 | +1+1i | −1+1i | +1+1i | +1−1i |
| 11100010 | +1+1i | +1−1i | −1−1i | +1−1i |
| 11100100 | +1+1i | +1−1i | −1+1i | −1−1i |
| 11101011 | +1+1i | +1−1i | +1−1i | +1+1i |
| 11101101 | +1+1i | +1−1i | +1+1i | −1+1i |
| 11110011 | +1+1i | +1+1i | −1−1i | +1+1i |
| 11110110 | +1+1i | +1+1i | −1+1i | +1−1i |
| 11111001 | +1+1i | +1+1i | +1−1i | −1+1i |
| 11111100 | +1+1i | +1+1i | +1+1i | −1−1i. |

25. A method of optically transmitting a data signal, the method comprising:

mapping a number of information bits of the data signal to a symbol in an eight-dimensional constellation space spanned by vectors IXT1, QXT1, IYT1, QYT1, IXT2, QXT2, IYT2, QYT2, wherein I and Q are in-phase and quadrature components of an optical carrier, X and Y are orthogonal polarizations of the optical carrier, and T1 and T2 are two consecutive transmission time slots, by selecting the symbol from a set of constellation points in the eight-dimensional constellation space;

using the selected symbol in the two consecutive transmission time slots T1 and T2 to modulate a first carrier wave and a second carrier wave; and transmitting the first carrier wave and the second carrier wave over the orthogonal polarizations X and Y of the optical carrier;

wherein the set of constellation points does not comprise any constellation point with parallel Stokes vectors in the two consecutive transmission time slots T1 and T2 and comprises one or more constellation points with orthogonal Stokes vectors in the two consecutive transmission time slots T1 and T2.

\* \* \* \* \*

UNITED STATES PATENT AND TRADEMARK OFFICE
CERTIFICATE OF CORRECTION

| | |
|---|---|
| PATENT NO. | : 11,496,221 B2 |
| APPLICATION NO. | : 17/402268 |
| DATED | : November 8, 2022 |
| INVENTOR(S) | : Bendimerad et al. |

It is certified that error appears in the above-identified patent and that said Letters Patent is hereby corrected as shown below:

On the Title Page

(30) Foreign Application Priority Data: "Sep. 5, 2017 (WO) .............. PCT/EP2017/072258" should read -- Sep. 5, 2017 (EP) .............. PCT/EP2017/072258 --.

Signed and Sealed this
Eleventh Day of April, 2023

Katherine Kelly Vidal
*Director of the United States Patent and Trademark Office*